United States Patent
Oiwa et al.

(10) Patent No.: US 12,033,655 B2
(45) Date of Patent: Jul. 9, 2024

(54) SOUND OUTPUT CONTROL APPARATUS, SOUND OUTPUT CONTROL SYSTEM, SOUND OUTPUT CONTROL METHOD, AND PROGRAM

(71) Applicant: Sony Interactive Entertainment Inc., Tokyo (JP)

(72) Inventors: Takuma Oiwa, Tokyo (JP); Yoshihisa Onoue, Kanagawa (JP); Shogo Suzuki, Tokyo (JP); Shin Nagata, Tokyo (JP); Makoto Oshita, Tokyo (JP); Yuji Kojima, Tokyo (JP); Akihisa Sumi, Tochigi (JP)

(73) Assignee: Sony Interactive Entertainment Inc., Tokyo (JP)

( * ) Notice: Subject to any disclaimer, the term of this patent is extended or adjusted under 35 U.S.C. 154(b) by 137 days.

(21) Appl. No.: 17/429,656

(22) PCT Filed: Feb. 13, 2020

(86) PCT No.: PCT/JP2020/005634
§ 371 (c)(1),
(2) Date: Aug. 10, 2021

(87) PCT Pub. No.: WO2020/170946
PCT Pub. Date: Aug. 27, 2020

(65) Prior Publication Data
US 2022/0208210 A1    Jun. 30, 2022

(30) Foreign Application Priority Data
Feb. 19, 2019 (JP) ................................. 2019-027628

(51) Int. Cl.
*G10L 21/0364* (2013.01)
*G10L 19/16* (2013.01)
(Continued)

(52) U.S. Cl.
CPC ........ *G10L 21/0364* (2013.01); *G10L 19/167* (2013.01); *G10L 21/034* (2013.01);
(Continued)

(58) Field of Classification Search
CPC .................................................... G10L 21/0364
See application file for complete search history.

(56) References Cited

U.S. PATENT DOCUMENTS 5,978,463 A * 11/1999 Jurkevics ............... G06Q 10/02
379/202.01
6,665,728 B1 * 12/2003 Graumann ....... H04N 21/64738
375/E7.014
(Continued)

FOREIGN PATENT DOCUMENTS

| CN | 101252452 A | 8/2008 |
| CN | 104167210 A | 11/2014 |

(Continued)

OTHER PUBLICATIONS

Notice of Reasons for Refusal for corresponding JP Application No. 2021-501923, 8 pages, dated Mar. 15, 2022.
(Continued)

*Primary Examiner* — Shaun Roberts
(74) *Attorney, Agent, or Firm* — Matthew B. Dernier, Esq.

(57) ABSTRACT

Provided are a sound output control apparatus, a sound output control system, a sound output control method, and a program that can appropriately thin out the output of pieces of sound data. A sound data reception section receives a plurality of pieces of sound data transmitted from transmission apparatuses that are different from each other. A selection section selects a portion of the plurality of pieces of sound data on the basis of at least one of a result of a voice activity detection process performed on each of the pieces of
(Continued)

sound data or moving averages of volumes of sounds represented by the pieces of sound data. A sound data transmission section outputs the selected portion of the pieces of sound data.

9 Claims, 12 Drawing Sheets

(51) Int. Cl.
*G10L 21/034* (2013.01)
*G10L 25/78* (2013.01)
*A63F 13/87* (2014.01)
*H04M 3/56* (2006.01)

(52) U.S. Cl.
CPC .............. *G10L 25/78* (2013.01); *A63F 13/87* (2014.09); *A63F 2300/572* (2013.01); *H04M 3/563* (2013.01)

(56) References Cited

U.S. PATENT DOCUMENTS

| | | | | |
|---|---|---|---|---|
| 6,798,786 B1* | 9/2004 | Lo | ........................ | H04L 65/1101 |
| | | | | 370/468 |
| 6,839,416 B1* | 1/2005 | Shaffer | .................. | H04M 3/56 |
| | | | | 709/204 |
| 10,375,131 B2* | 8/2019 | Caramma | ............. | G10L 19/167 |
| 2005/0237952 A1* | 10/2005 | Punj | ........................ | H04L 47/70 |
| | | | | 370/260 |
| 2007/0230677 A1* | 10/2007 | Rodman | .............. | H04M 11/066 |
| | | | | 379/202.01 |
| 2011/0044474 A1* | 2/2011 | Grover | .................... | H04M 3/40 |
| | | | | 379/202.01 |
| 2013/0342637 A1* | 12/2013 | Felkai | ..................... | H04L 69/24 |
| | | | | 348/E7.083 |
| 2014/0022956 A1* | 1/2014 | Ramalho | ............... | H04L 65/403 |
| | | | | 370/260 |
| 2014/0369528 A1* | 12/2014 | Ellner | ................... | H04M 3/568 |
| | | | | 381/119 |
| 2015/0281648 A1 | 10/2015 | Decker | | |
| 2018/0091564 A1 | 3/2018 | Ivov | | |
| 2018/0270360 A1* | 9/2018 | Wang | .................... | H04L 65/764 |

FOREIGN PATENT DOCUMENTS

CN 104486518 A 4/2015
EP 2018058 A1 1/2009

OTHER PUBLICATIONS

International Preliminary Report on Patentability and Written Opinion for corresponding PCT Application No. PCT/JP2020/005634, 13 pages, dated Aug. 10, 2021.
International Search Report for corresponding PCT Application No. PCT/JP2020/005634, 6 pages, dated Apr. 21, 2020.

* cited by examiner

FIG.7

PARTY ID : 001

| USER ID | CONNECTION DESTINATION ADDRESS DATA | TYPE DATA | P2P CONNECTION FLAG |
|---|---|---|---|
| aaa | 11.xxx.xxx.xxx | GAME CONSOLE | 1 |
| bbb | 22.xxx.xxx.xxx | GAME CONSOLE | 1 |
| ccc | 33.xxx.xxx.xxx | GAME CONSOLE | 1 |
| ddd | 44.xxx.xxx.xxx | SMARTPHONE | 0 |
| eee | 55.xxx.xxx.xxx | PERSONAL COMPUTER | 0 |
| fff | 66.xxx.xxx.xxx | GAME CONSOLE | 0 |

SOUND OUTPUT CONTROL APPARATUS, SOUND OUTPUT CONTROL SYSTEM, SOUND OUTPUT CONTROL METHOD, AND PROGRAM

TECHNICAL FIELD

The present invention relates to a sound output control apparatus, a sound output control system, a sound output control method, and a program.

BACKGROUND ART

In recent years, it has increasingly become common for users to play games while voice-chatting with other users at distant locations, such as users who are playing games together or viewers of moving images representing the game play state.

SUMMARY

Technical Problems

An increase in the number of users participating in voice chat increases the load on the apparatus that each user uses to input and output speech during voice chat and a server that relays sound data. Further, the communication volume of a sound data communication path increases. This causes a decrease in the service quality of voice chat and an increase in the operational cost and communication cost of the server, for example.

Thus, in voice chat in which many users participate, it is necessary to appropriately thin out the output of pieces of sound data to appropriately suppress the above-described load and communication volume. However, this has not been done with conventional voice chat techniques.

The present invention has been made in view of the circumstances described above. It is an object of the present invention to provide a sound output control apparatus, a sound output control system, a sound output control method, and a program that can appropriately thin out the output of pieces of sound data.

Solution to Problems

In order to solve the issue described above, a sound output control apparatus according to the present invention includes a reception section configured to receive a plurality of pieces of sound data transmitted from transmission apparatuses that are different from each other; a selection section configured to select a portion of the plurality of pieces of sound data on the basis of at least one of a result of a voice activity detection process performed on each of the pieces of sound data or moving averages of volumes of sounds represented by the pieces of sound data; and an output section configured to output the selected portion of the pieces of sound data.

Further, in an aspect of the present invention, the output section transmits the selected portion of the pieces of sound data to a reception apparatus capable of voice-chatting with the transmission apparatuses.

In this aspect, from among the plurality of pieces of sound data, the selection section may select pieces of sound data in the number determined on the basis of the type of the reception apparatus.

Further, in an aspect of the present invention, a decoding section configured to decode the pieces of sound data is further included. The output section outputs the selected portion of the pieces of sound data to the decoding section.

Further, in an aspect of the present invention, from among the plurality of pieces of sound data, the selection section selects pieces of sound data in the number determined on the basis of a load on the sound output control apparatus or a communication quality of a computer network to which the sound output control apparatus is connected.

Further, a sound output control system according to the present invention includes a plurality of communication apparatuses included in a first group, a plurality of communication apparatuses included in a second group, and a relay apparatus, in which the relay apparatus includes a first reception section configured to receive a plurality of pieces of sound data transmitted from the communication apparatuses that are included in the first group and different from each other and a transmission section configured to transmit a portion selected from among the plurality of pieces of sound data received by the first reception section of the relay apparatus to the communication apparatuses other than any communication apparatus that has transmitted sound data corresponding to the portion, and each of the communication apparatuses included in the second group includes a decoding section configured to decode the pieces of sound data, a second reception section configured to receive the portion of the pieces of sound data, the portion having been transmitted from the relay apparatus, and at least one piece of sound data transmitted from any of the other communication apparatuses that are included in the second group and different from each other, and an output section configured to output a portion of a plurality of the pieces of sound data received by the second reception section of the communication apparatus to the decoding section.

Further, in an aspect of the present invention, a determination section configured to determine, on the basis of the number of the communication apparatuses that transmit and receive the pieces of sound data to and from each other, whether a communication apparatus newly added to the sound output control system is to be included in the first group or the second group is further included.

Further, a sound output control method according to the present invention includes a step of receiving a plurality of pieces of sound data transmitted from transmission apparatuses that are different from each other; a step of selecting a portion of the plurality of pieces of sound data on the basis of at least one of a result of a voice activity detection process performed on each of the pieces of sound data or moving averages of volumes of sounds represented by the pieces of sound data; and a step of outputting the selected portion of the pieces of sound data.

Further, a program according to the present invention causes a computer to execute a procedure of receiving a plurality of pieces of sound data transmitted from transmission apparatuses that are different from each other; a procedure of selecting a portion of the plurality of pieces of sound data on the basis of at least one of a result of a voice activity detection process performed on each of the pieces of sound data or moving averages of volumes of sounds represented by the pieces of sound data; and a procedure of outputting the selected portion of the pieces of sound data.

BRIEF DESCRIPTION OF DRAWINGS

FIG. 7 is a diagram illustrating an example of party management data.

DESCRIPTION OF EMBODIMENT

Figure 1:
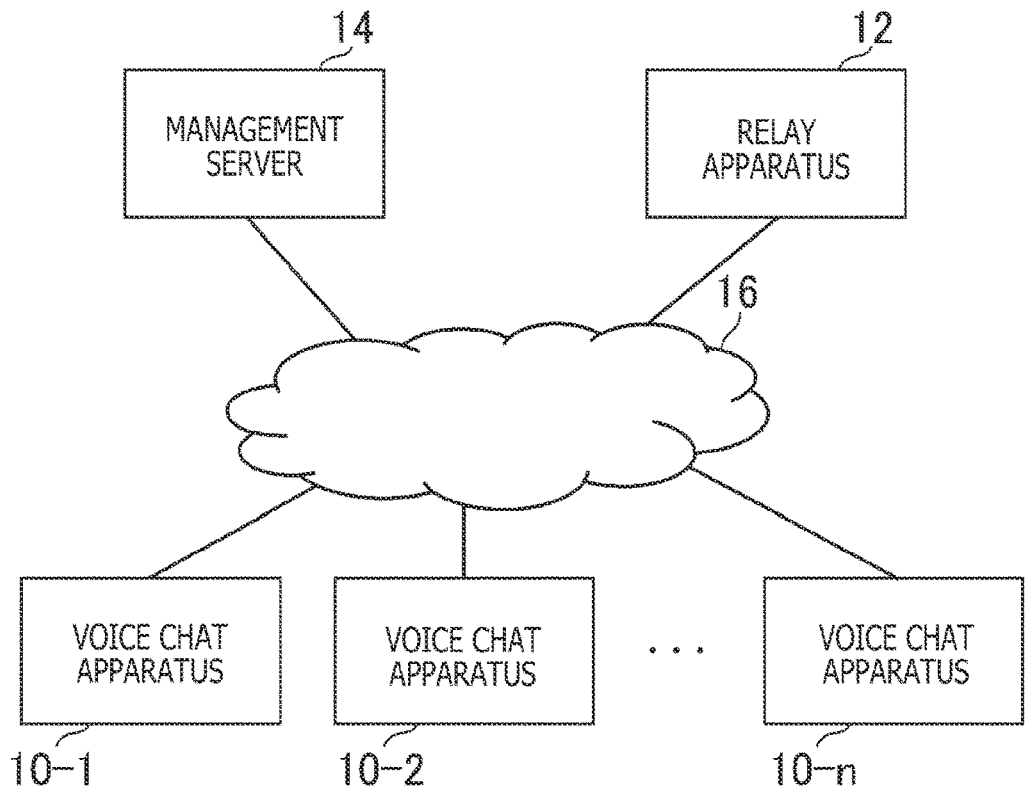
FIG. 1 is a diagram illustrating an example of an overall configuration of a voice chat system according to an embodiment of the present invention.

FIG. 1 is a diagram illustrating an example of the overall configuration of a voice chat system 1 according to an embodiment of the present invention. As illustrated in FIG. 1, the voice chat system 1 includes voice chat apparatuses 10 (10-1, 10-2, . . . , 10-n), a relay apparatus 12, and a management server 14, all of which mainly include a computer. The voice chat apparatuses 10, the relay apparatus 12, and the management server 14 are connected to a computer network 16 such as the Internet. The voice chat apparatuses 10, the relay apparatus 12, and the management server 14 can communicate with each other.

The management server 14 is a computer such as a server that manages, for example, account information and the like of each user who uses the voice chat system 1. The management server 14 stores, for example, a plurality of pieces of account data associated with users. Here, each account data includes, for example, a user identification (ID), real name data, email address data, and the like. The user ID is the identification information of a user. The real name data indicates the real name of the user. The email address data indicates the email address of the user.

The voice chat apparatus 10 is, for example, a computer, such as a game console, a portable game apparatus, a smartphone, or a personal computer, which is capable of inputting and outputting sounds in voice chat.

Figure 2A:
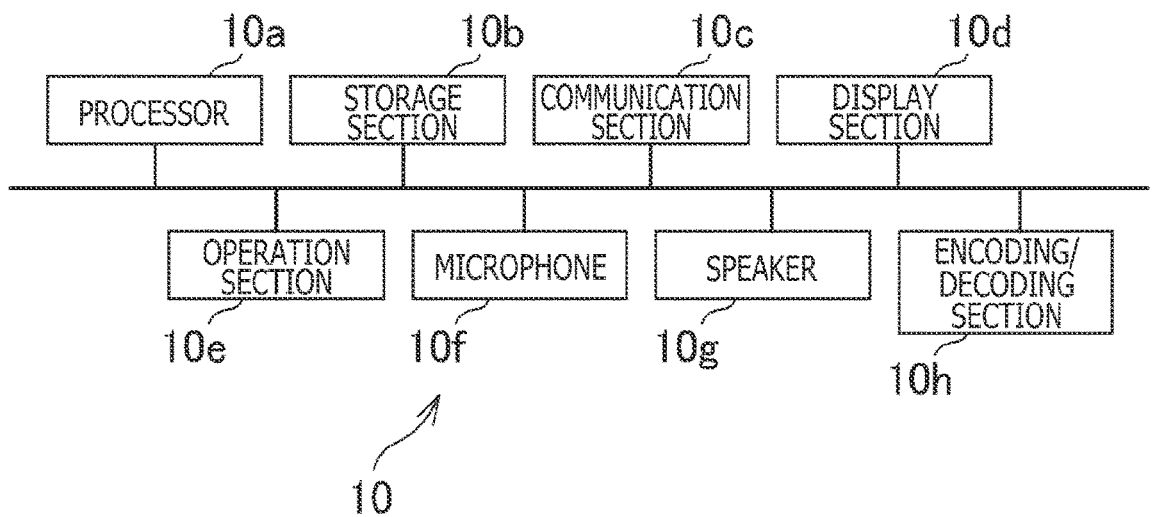
FIG. 2A is a diagram illustrating an example of a configuration of a voice chat apparatus according to the embodiment of the present invention.

As illustrated in FIG. 2A, the voice chat apparatus 10 includes, for example, a processor 10a, a storage section 10b, a communication section 10c, a display section 10d, an operation section 10e, a microphone 10f, a speaker 10g, and an encoding and decoding section 10h. It is noted that the voice chat apparatus 10 may include a camera.

The processor 10a is, for example, a program control device such as a central processing unit (CPU) and performs various information processes according to a program stored in the storage section 10b.

The storage section 10b is, for example, a storage element such as a read only memory (ROM) or a random access memory (RAM), a hard disk drive, or the like.

The communication section 10c is, for example, a communication interface for exchanging data with computers such as the other voice chat apparatuses 10, the relay apparatus 12, and the management server 14 via the computer network 16.

The display section 10d is, for example, a liquid crystal display or the like. The display section 10d displays, for example, a screen generated by the processor 10a and a moving image represented by moving image data received via the communication section 10c.

The operation section 10e is, for example, an operation member for performing operation input to the processor 10a.

The microphone 10f is a sound input device used to input, for example, sounds for voice chat.

The speaker 10g is a sound output device used to output, for example, sounds in voice chat.

The encoding and decoding section 10h includes, for example, an encoder and a decoder. The encoder encodes input sound to generate sound data representing the sound. Further, the decoder decodes input sound data and outputs the sound represented by the sound data.

In the present embodiment, the relay apparatus 12 is, for example, a computer such as a server that relays the sound data described above.

Figure 2B:
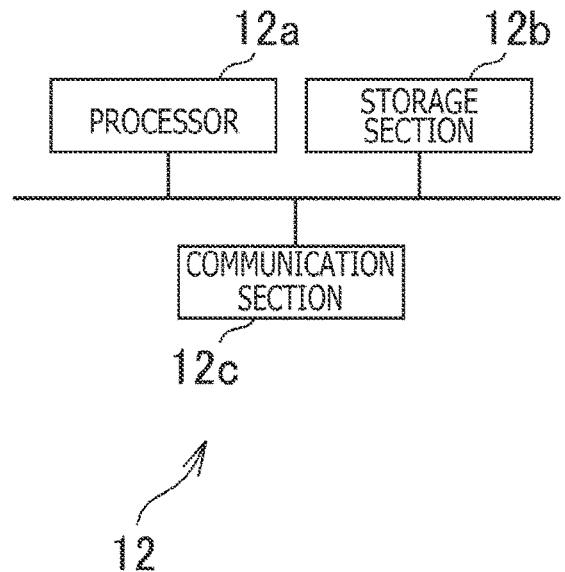
FIG. 2B is a diagram illustrating an example of a configuration of a relay apparatus according to the embodiment of the present invention.

As illustrated in FIG. 2B, the relay apparatus 12 according to the present embodiment includes, for example, a processor 12a, a storage section 12b, and a communication section 12c.

The processor 12a is, for example, a program control device such as a CPU and performs various information processes according to a program stored in the storage section 12b.

The storage section 12b is, for example, a storage element such as a ROM or a RAM, a hard disk drive, or the like.

The communication section 12c is a communication interface for exchanging data with computers such as the voice chat apparatuses 10 and the management server 14.

In the present embodiment, the users of the voice chat system 1 can enjoy voice chat with each other. Here, for example, the voice chat may be conducted while a moving image representing the play state of a game that is being played by some or all of the users participating in the voice chat is shared.

Further, in the present embodiment, voice chat can be conducted by a plurality of users. Here, in the present embodiment, a plurality of users participating in voice chat are assumed to belong to a group called a party. By performing a predetermined operation, each user of the voice chat system 1 according to the present embodiment can create a new party or join a party already created.

Figure 3:
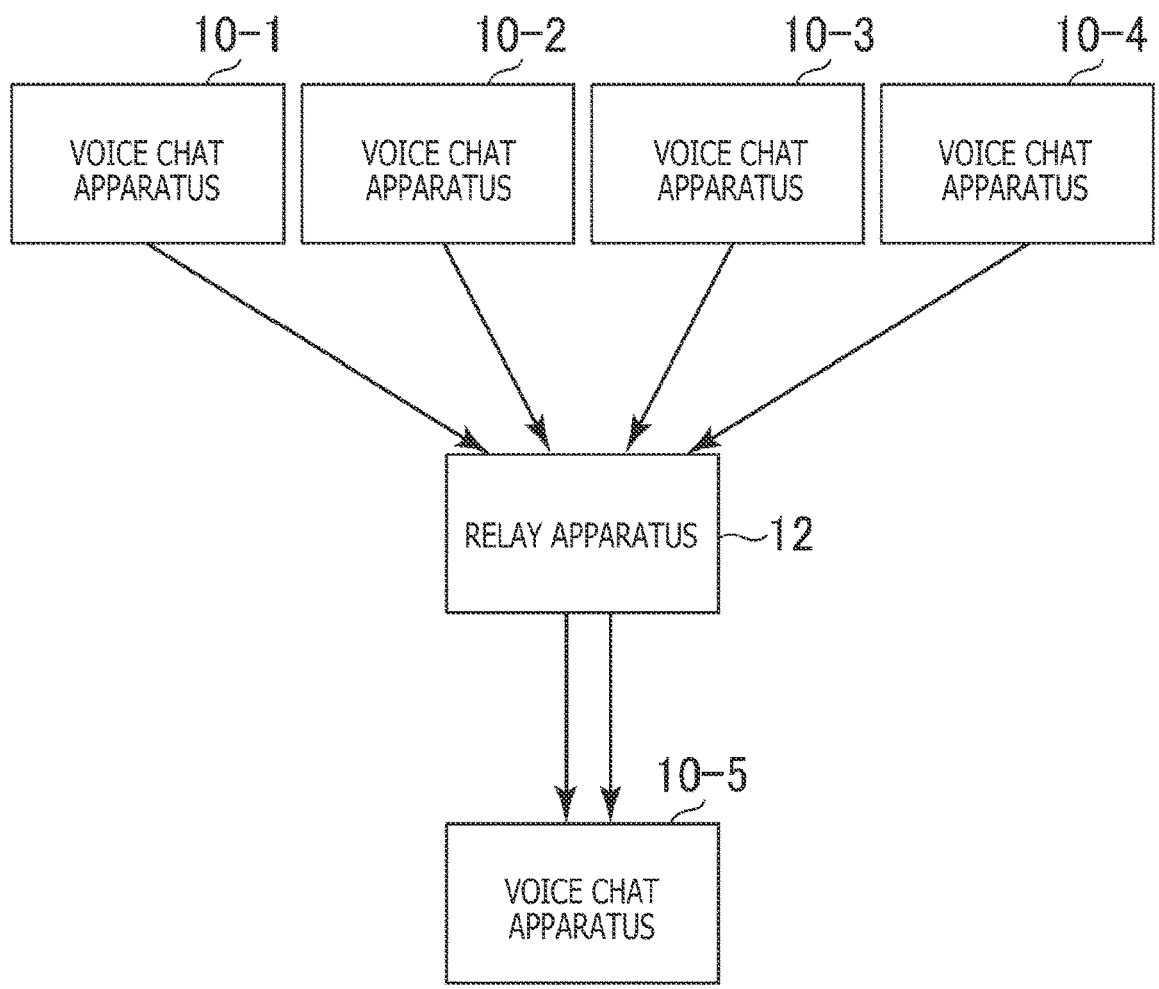
FIG. 3 is a diagram schematically illustrating an example of sound data transmission in the voice chat system according to the embodiment of the present invention.

FIG. 3 is a diagram schematically illustrating an example of sound data transmission in the voice chat system 1 according to the present embodiment.

In the example of FIG. 3, a user A, a user B, a user C, a user D, and a user E are assumed to be participating in a party. In addition, the user A to the user E are assumed to use voice chat apparatuses 10-1 to 10-5, respectively. In addition, in the example of the sound data transmission illustrated in FIG. 3, the voice chat apparatus 10-5 used by the user E receives sound data.

In the example of FIG. 3, pieces of sound data transmitted from the respective voice chat apparatuses 10-1 to 10-4 are transmitted to the relay apparatus 12. Then, the relay apparatus 12 selects a portion of the plurality of pieces of sound data. The relay apparatus 12 then transmits the selected portion of the pieces of sound data to the voice chat apparatus 10-5. In this manner, in the example of FIG. 3, the pieces of sound data to be received by the voice chat apparatus 10-5 are thinned out by the relay apparatus 12.

It is noted that this similarly applies to each of the voice chat apparatuses 10-1 to 10-4 in the example of FIG. 3. The relay apparatus 12 selects a portion of a plurality of pieces of sound data each transmitted from the voice chat apparatuses 10 other than the relevant voice chat apparatus 10. Then, the relay apparatus 12 transmits the selected portion of the pieces of sound data to the relevant voice chat apparatus 10.

Figure 4:
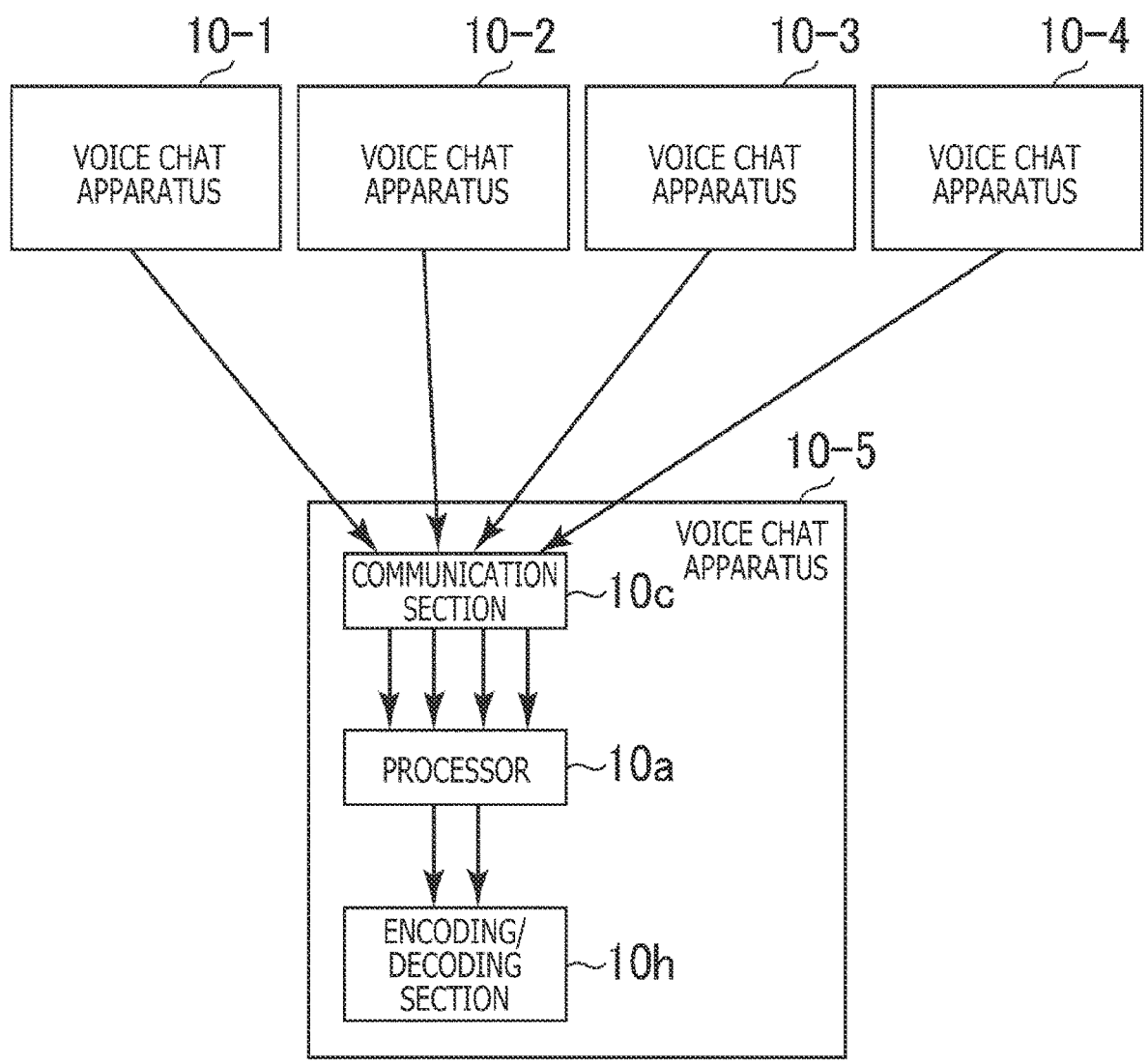
FIG. 4 is a diagram schematically illustrating an example of sound data transmission in the voice chat system according to the embodiment of the present invention.

FIG. 4 is a diagram schematically illustrating another example of sound data transmission in the voice chat system 1 according to the present embodiment.

In the example of FIG. 4 as well, the user A, the user B, the user C, the user D, and the user E are assumed to be participating in a party. In addition, the user A to the user E are assumed to use the voice chat apparatuses 10-1 to 10-5, respectively. In addition, in an example of sound data transmission illustrated in FIG. 4, the voice chat apparatus 10-5 used by the user E receives sound data.

In the example of FIG. 4, pieces of sound data transmitted from the respective voice chat apparatuses 10-1 to 10-4 are transmitted to the communication section 10c of the voice chat apparatus 10-5. The processor 10a of the voice chat apparatus 10-5 then selects a portion of the plurality of pieces of sound data. The processor 10a of the voice chat apparatus 10-5 then outputs the selected portion of the pieces of sound data to the encoding and decoding section 10h of the voice chat apparatus 10-5. In this manner, in the example of FIG. 4, the pieces of sound data to be input into the encoding and decoding section 10h of the voice chat apparatus 10-5 are thinned out by the processor 10a of the voice chat apparatus 10-5.

It is noted that this similarly applies to each of the voice chat apparatuses 10-1 to 10-4. The processor 10a of the relevant voice chat apparatus 10 selects a portion of a plurality of pieces of sound data each transmitted from the voice chat apparatuses 10 other than the relevant voice chat apparatus 10. Then, the processor 10a outputs the selected portion of the pieces of sound data to the encoding and decoding section 10h of the relevant voice chat apparatus 10.

Figure 5:
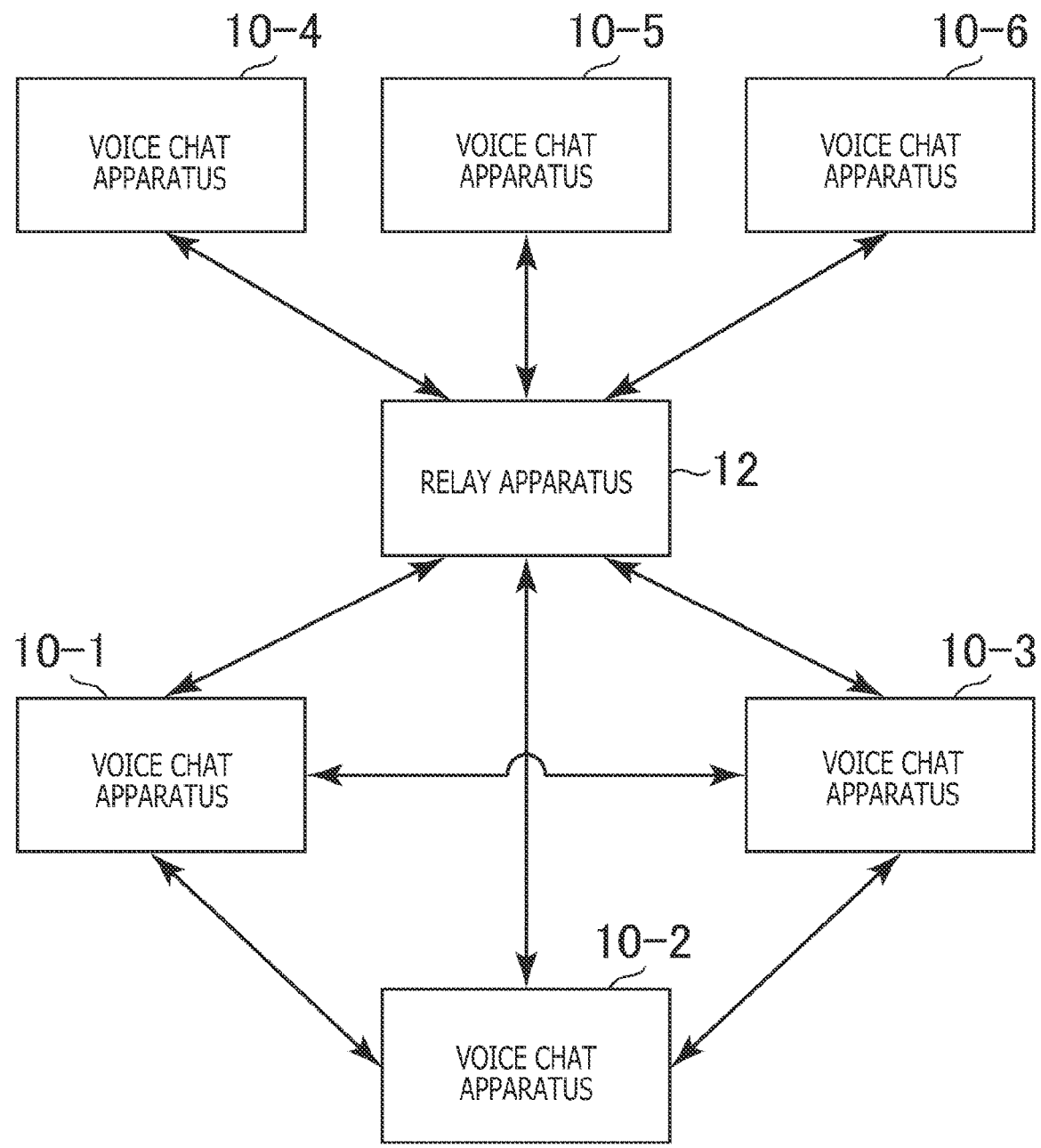
FIG. 5 is a diagram illustrating an example of a relation between voice chat apparatuses and the relay apparatus during communication in the voice chat system according to the embodiment of the present invention.
Figure 6:
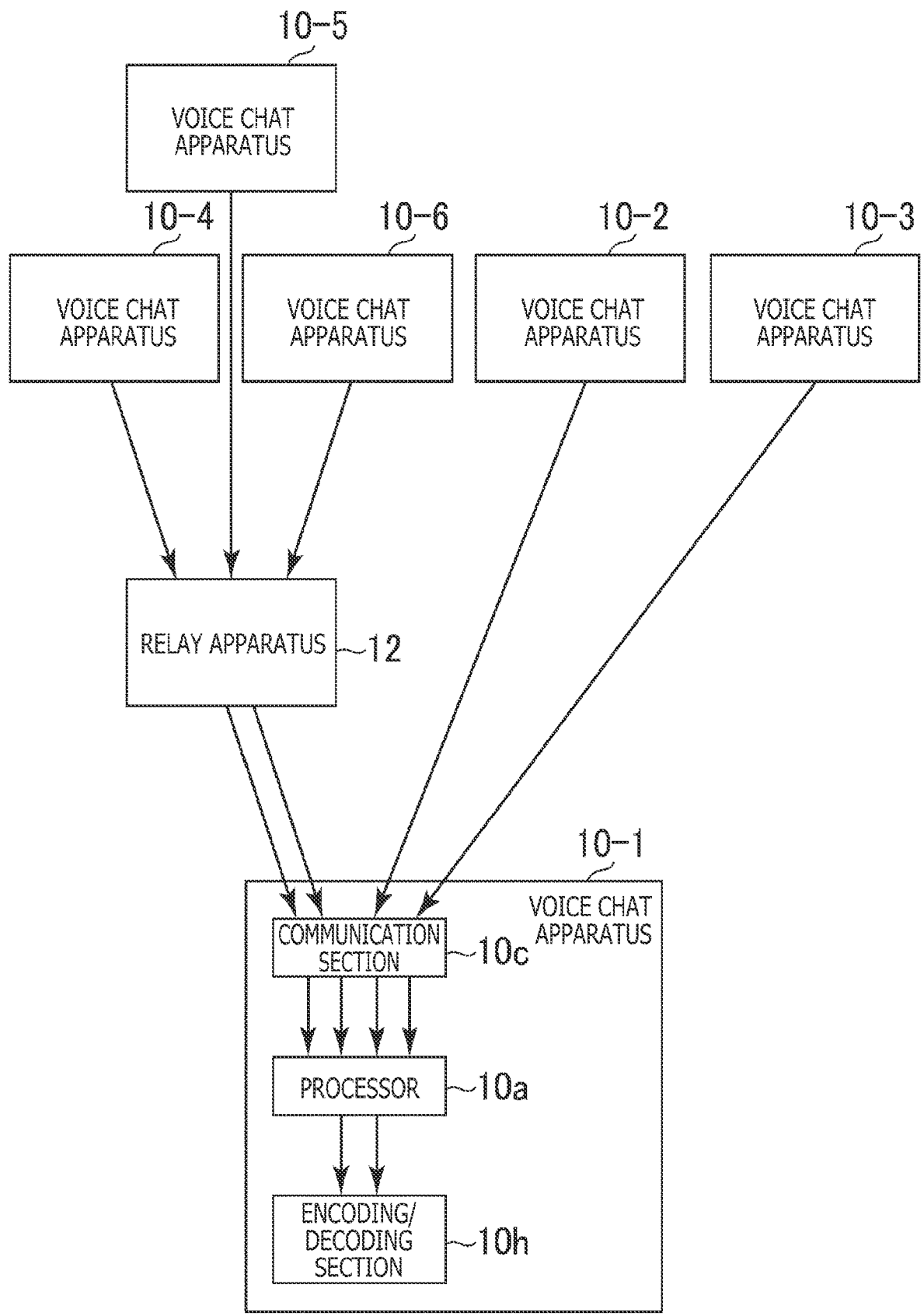
FIG. 6 is a diagram schematically illustrating an example of sound data transmission in the voice chat system according to the embodiment of the present invention.

FIGS. 5 and 6 are diagrams each schematically illustrating yet another example of sound data transmission in the voice chat system 1 according to the present embodiment.

In the examples of FIGS. 5 and 6, the user A, the user B, the user C, the user D, the user E, and a user F are assumed to be participating in a party. In addition, the user A to the user F are assumed to use the voice chat apparatuses 10-1 to 10-6, respectively.

As illustrated in FIG. 5, here, for example, the voice chat apparatuses 10-1 to 10-3 transmit and receive pieces of sound data to and from each other through a peer-to-peer (P2P) connection. By contrast, each of the voice chat apparatuses 10-4 to 10-6 transmits and receives pieces of sound data to and from the other voice chat apparatuses 10 via the relay apparatus 12.

Thus, for example, the voice chat apparatus 10-1 transmits, not via the relay apparatus 12 but directly, sound data addressed to the voice chat apparatus 10-2 to the voice chat apparatus 10-2. Further, the voice chat apparatus 10-1 transmits, not via the relay apparatus 12 but directly, sound data addressed to the voice chat apparatus 10-3 to the voice chat apparatus 10-3.

By contrast, the voice chat apparatus 10-1 transmits sound data addressed to the voice chat apparatuses 10-4 to 10-6 to the relay apparatus 12.

This similarly applies to the voice chat apparatuses 10-2 and 10-3. Each of the voice chat apparatuses 10-2 and 10-3 directly transmits sound data addressed to the voice chat apparatuses 10 that are P2P-connected to those voice chat apparatuses 10, while transmitting, to the relay apparatus 12, sound data addressed to the voice chat apparatuses 10 that are not P2P-connected to those voice chat apparatuses 10.

Further, as for the voice chat apparatuses 10-4 to 10-6, each of the voice chat apparatuses 10 transmits sound data addressed to the other voice chat apparatuses 10 to the relay apparatus 12.

In addition, in the example of sound data transmission illustrated in FIG. 6, the voice chat apparatus 10-1 used by the user A receives sound data in the situation illustrated in FIG. 5.

In the example of FIG. 6, as described above, pieces of sound data transmitted from the respective voice chat apparatuses 10-4 to 10-6 are transmitted to the relay apparatus 12. The relay apparatus 12 then selects a portion of the plurality of pieces of sound data. The relay apparatus 12 then transmits the selected portion of the pieces of sound data to the voice chat apparatus 10-1. In this manner, in the example of FIG. 6, the pieces of sound data to be transmitted from the relay apparatus 12 and received by the voice chat apparatus 10-1 are thinned out by the relay apparatus 12.

In addition, in the example of FIG. 6, in addition to the pieces of sound data transmitted from the relay apparatus 12, pieces of sound data transmitted from the respective voice chat apparatuses 10-2 and 10-3 are also transmitted to the communication section 10c of the voice chat apparatus 10-1. The processor 10a of the voice chat apparatus 10-1 then selects a portion of the plurality of pieces of sound data. The processor 10a of the voice chat apparatus 10-1 then outputs the selected portion of the pieces of sound data to the encoding and decoding section 10h of the voice chat apparatus 10-1. In this manner, in the example of FIG. 6, the pieces of sound data to be input into the encoding and decoding section 10h of the voice chat apparatus 10-1 are thinned out by the processor 10a of the voice chat apparatus 10-1.

It is noted that this similarly applies to the voice chat apparatuses 10-2 and 10-3. The relay apparatus 12 selects a portion of a plurality of pieces of sound data transmitted from the respective voice chat apparatuses 10-4 to 10-6. The relay apparatus 12 then transmits the selected portion of the pieces of sound data to the relevant voice chat apparatuses 10. Further, the processor 10a of the relevant voice chat apparatus 10 selects a portion of the plurality of pieces of sound data received by the communication section 10c of the relevant voice chat apparatus 10. The selected portion of the pieces of sound data is then output to the encoding and decoding section 10*h* of the relevant voice chat apparatus 10.

As the number of users participating in the voice chat increases, the load on the voice chat apparatuses 10 and the relay apparatus 12 increases. Further, the communication volume of a sound data communication path increases. According to the example of FIG. 3, the pieces of sound data to be transmitted from the relay apparatus 12 to the voice chat apparatus 10-5 are thinned out by the relay apparatus 12. Thus, the communication volume (network traffic) of pieces of sound data flowing through the computer network 16 can be suppressed. Further, for example, in a case where the relay apparatus 12 is such that the operational cost thereof increases in proportion to an increase in the amount of data transmission, the operational cost of the relay apparatus 12 can be suppressed by employing the example of FIG. 3.

Further, according to the example of FIG. 4, since the pieces of sound data to be input into the encoding and decoding section 10*h* of the voice chat apparatus 10-5 are thinned out, the decoding process load in the voice chat apparatus 10-5 can be suppressed.

Further, according to the examples of FIGS. 5 and 6, the selection of pieces of sound data is dispersedly performed by the relay apparatus 12 and the voice chat apparatus 10. As a result, the suppression of the communication volume of pieces of sound data flowing through the computer network 16, the suppression of the operational cost of the relay apparatus 12, and the suppression of the decoding process load in the voice chat apparatus 10-1 can be achieved with a good balance.

In the present embodiment, information regarding a party, such as a sound data communication path as illustrated in FIG. 5, is managed by party management data stored in the management server 14, for example. The party management data is exemplified in FIG. 7. As illustrated in FIG. 7, the party management data includes a party ID, which is the identification information of the party, and pieces of user data, which are associated with corresponding users participating in the party. In addition, each user data includes a user ID, connection destination address data, type data, a P2P connection flag, and the like.

The user ID is, for example, the identification information of the corresponding user. The connection destination address data is, for example, data indicating the address of the voice chat apparatus 10 used by the relevant user. The type data is, for example, data indicating the type of voice chat apparatus 10 used by the relevant user. Here, examples of the type of voice chat apparatus 10 include a game console, a portable game apparatus, a smartphone, a personal computer, and the like as described above. The P2P connection flag is, for example, a flag indicating whether or not the voice chat apparatus 10 used by the relevant user performs the P2P connection.

Here, for example, the voice chat apparatus 10 that performs the P2P connection refers to the voice chat apparatus 10 that performs the P2P connection with the voice chat apparatuses 10 used by some or all of the other users participating in the party. In the example of FIG. 5, the voice chat apparatuses 10-1 to 10-3 correspond to the voice chat apparatuses 10 that perform the P2P connection. Further, similarly, the voice chat apparatuses 10-1 to 10-5 illustrated in FIG. 4 also correspond to the voice chat apparatuses 10 that perform the P2P connection.

In addition, the voice chat apparatus 10 that does not perform the P2P connection refers to the voice chat apparatus 10 that is connected, via the relay apparatus 12, to the voice chat apparatuses 10 used by all the other users participating in the party. In the example of FIG. 5, the voice chat apparatuses 10-4 to 10-6 correspond to the voice chat apparatuses 10 that do not perform the P2P connection. Further, similarly, the voice chat apparatuses 10-1 to 10-5 illustrated in FIG. 3 also correspond to the voice chat apparatuses 10 that do not perform the P2P connection.

Here, for example, the value of the P2P connection flag is set to 1 in the user data of the user using the voice chat apparatus 10 that performs the P2P connection. Further, for example, the value of the P2P connection flag is set to 0 in the user data of the user using the voice chat apparatus 10 that does not perform the P2P connection.

FIG. 7 exemplifies the party management data whose party ID is 001. This party management data is associated with a party in which six users participate. The party management data illustrated in FIG. 7 includes six pieces of user data each of which is associated with a corresponding user participating in the party. Hereinafter, the user whose user ID is aaa, the user whose user ID is bbb, the user whose user ID is ccc, the user whose user ID is ddd, the user whose user ID is eee, and the user whose user ID is fff will be referred to as the user A, the user B, the user C, the user D, the user E, and the user F, respectively. Further, the user A, the user B, the user C, the user D, the user E, and the user F are assumed to use the voice chat apparatuses 10-1, 10-2, 10-3, 10-4, 10-5, and 10-6, respectively.

Further, in the present embodiment, a copy of the party management data stored in the management server 14 is transmitted to the voice chat apparatuses 10 used by the users participating in the party associated with this party management data and the relay apparatus 12. In addition, the copy of the party management data stored in the management server 14 is stored in the storage section 10*b* of each voice chat apparatus 10 and the storage section 12*b* of the relay apparatus 12. Thus, the voice chat apparatus 10 used by the user participating in the party can identify the addresses of the voice chat apparatuses 10 used by the other users participating in this party.

Further, data indicating the address of the relay apparatus 12 is also stored in the storage section 10*b* of each voice chat apparatus 10. Thus, the voice chat apparatuses 10 can identify the address of the relay apparatus 12.

Further, in the present embodiment, the party management data stored in the management server 14 is updated in response to, for example, a user's operation to join a party or the like. In addition, whenever the party management data stored in the management server 14 is updated, a copy of the updated party management data is transmitted to the voice chat apparatuses 10 used by the users participating in the party associated with this party management data and the relay apparatus 12. Then, the copy of the party management data stored in the storage section 10*b* of each voice chat apparatus 10 and the storage section 12*b* of the relay apparatus 12 is updated. In this manner, in the present embodiment, the latest information indicated in the party management data is shared among the voice chat apparatuses 10 used by the users participating in the party associated with this party management data.

In addition, in the present embodiment, for example, each of the voice chat apparatuses 10 that perform the P2P connection directly transmits sound data addressed to the other voice chat apparatuses 10 that perform the P2P connection to the other voice chat apparatuses 10. In addition, each of the voice chat apparatuses 10 that perform the P2P connection transmits the sound data addressed to the other voice chat apparatuses 10 that do not perform the P2P connection to the relay apparatus 12.

In addition, in the present embodiment, for example, each of the voice chat apparatuses 10 that do not perform the P2P connection transmits sound data addressed to the other voice chat apparatuses 10 to the relay apparatus 12.

By using the party management data exemplified in FIG. 7 in this manner, it is possible to appropriately control whether sound data is to be transmitted to the voice chat apparatuses 10 or the relay apparatus 12.

Further, in the sound data selection described above, a portion of the plurality of pieces of sound data may be selected on the basis of at least one of the result of the voice activity detection (VAD) process performed on each of the pieces of sound data or the volumes of the sounds represented by the pieces of sound data.

For example, for each predetermined time period (e.g., 20 milliseconds, 40 milliseconds, or the like), the voice chat apparatus 10 may generate sound data corresponding to this time period by encoding the sound input over this time period.

Then, the voice chat apparatus 10 may determine whether or not the relevant sound data represents a human voice by performing a known voice activity detection process on the relevant sound data. The voice chat apparatus 10 may then generate VAD data indicating whether or not the relevant sound data represents a human voice. Here, for example, in a case where the relevant sound data represents a human voice, the voice chat apparatus 10 may generate VAD data with a value of 1, otherwise VAD data with a value of 0.

Further, the voice chat apparatus 10 may identify the volume of the sound represented by the relevant sound data. Then, the voice chat apparatus 10 may generate volume data indicating the volume of the sound represented by the relevant sound data.

In addition, the voice chat apparatus 10 may transmit the relevant sound data associated with the identification information of the voice chat apparatus 10 (e.g., the user ID corresponding to the voice chat apparatus 10), the VAD data described above, and the volume data described above. Further, data indicating a time period corresponding to the relevant sound data, such as a timestamp, may be associated with the relevant sound data.

Then, the relay apparatus 12 receives a plurality of pieces of sound data from each of the voice chat apparatuses 10 that are different from each other. For each predetermined time period, the relay apparatus 12 may select a portion of a plurality of pieces of sound data received during this time period. Here, for example, the selection may be made on the basis of the VAD data and the volume data associated with each sound data. Then, the selected portion of the pieces of sound data may be transmitted.

Further, the voice chat apparatus 10 receives a plurality of pieces of sound data from each of the voice chat apparatuses 10 that are different from each other. For each predetermined time period, the voice chat apparatus 10 may select a portion of a plurality of pieces of sound data received during this time period. Here, for example, the selection may be made on the basis of the VAD data and the volume data associated with each sound data. Then, the selected portion of the pieces of sound data may be output to the encoding and decoding section 10h of the relevant voice chat apparatus 10.

Specific examples of the selection based on the VAD data and the volume data will be described later.

Hereinafter, the functions implemented in the voice chat system 1 according to the present embodiment and the processes performed in the voice chat system 1 according to the present embodiment will be further described, focusing on the sound data selection and the transmission of the selected pieces of sound data.

Figure 8:
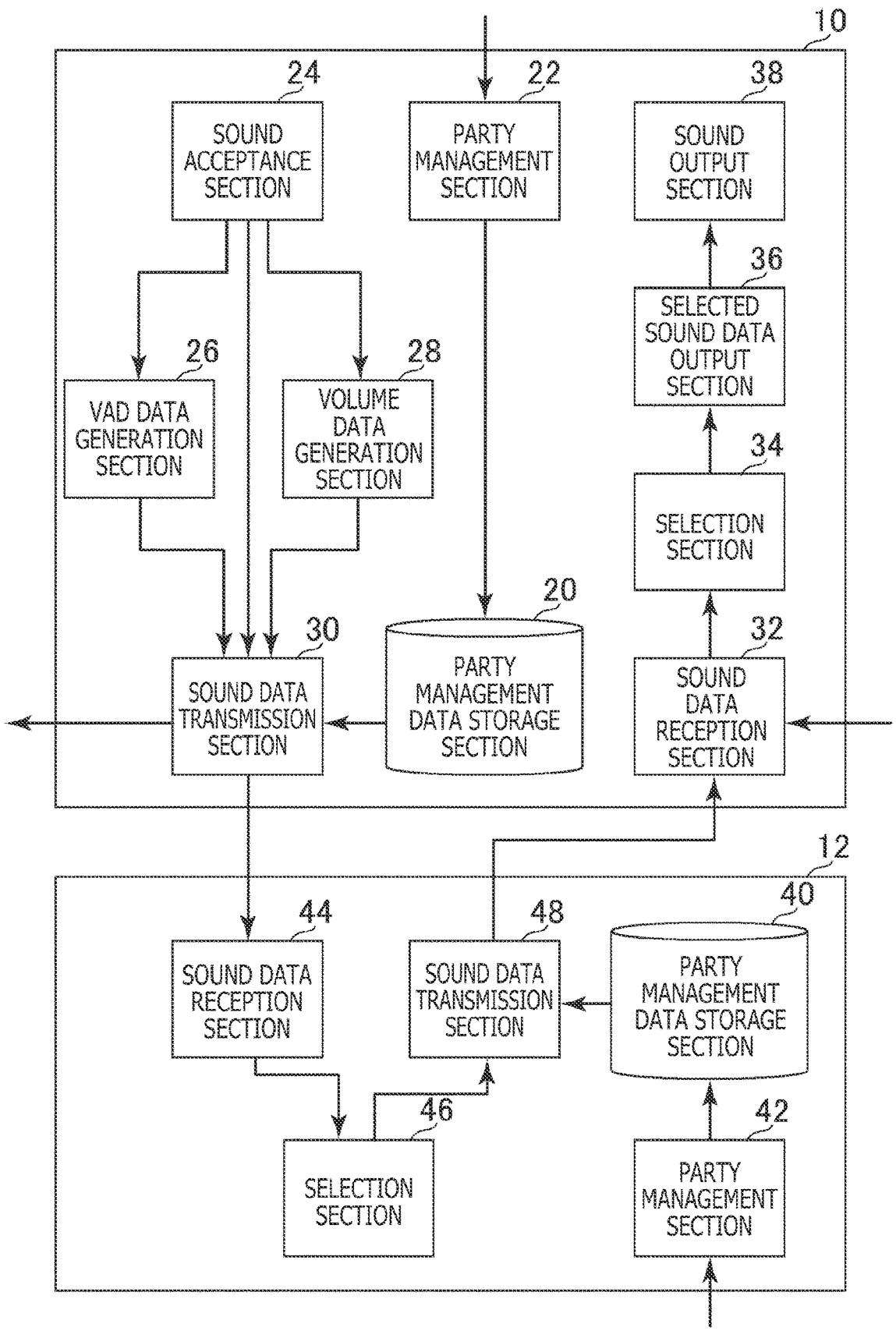
FIG. 8 is a functional block diagram illustrating an example of functions implemented in the voice chat apparatus and the relay apparatus according to the embodiment of the present invention.

FIG. 8 is a functional block diagram illustrating an example of the functions implemented in the voice chat apparatus 10 and the relay apparatus 12 according to the present embodiment. It is noted that all of the functions illustrated in FIG. 8 do not need to be implemented in the voice chat apparatus 10 and the relay apparatus 12 according to the present embodiment. Further, functions other than those illustrated in FIG. 8 may also be implemented.

As illustrated in FIG. 8, the voice chat apparatus 10 according to the present embodiment functionally includes a party management data storage section 20, a party management section 22, a sound acceptance section 24, a VAD data generation section 26, a volume data generation section 28, a sound data transmission section 30, a sound data reception section 32, a selection section 34, a selected sound data output section 36, and a sound output section 38, for example.

The party management data storage section 20 is implemented mainly by the storage section 10b. The party management section 22 is mainly implemented by the processor 10a and the communication section 10c. The sound acceptance section 24 is mainly implemented by the microphone 10f and the encoding and decoding section 10h. The VAD data generation section 26, the volume data generation section 28, the selection section 34, and the selected sound data output section 36 are mainly implemented by the processor 10a. The sound data transmission section 30 and the sound data reception section 32 are mainly implemented by the communication section 10c. The sound output section 38 is mainly implemented by the encoding and decoding section 10h and the speaker 10g.

In addition, the functions described above are implemented by the processor 10a executing a program installed in the voice chat apparatus 10, which is a computer. The program includes instructions corresponding to the above-described functions. This program is supplied to the voice chat apparatus 10 via, for example, a computer-readable information storage medium such as an optical disc, a magnetic disk, a magnetic tape, a magneto-optical disk, or a flash memory, or via the Internet or the like.

Further, as illustrated in FIG. 8, the relay apparatus 12 according to the present embodiment functionally includes a party management data storage section 40, a party management section 42, a sound data reception section 44, a selection section 46, and a sound data transmission section 48, for example.

The party management data storage section 40 is mainly implemented by the storage section 12b. The party management section 42 is mainly implemented by the processor 12a and the communication section 12c. The sound data reception section 44 and the sound data transmission section 48 are mainly implemented by the communication section 12c. The selection section 46 is mainly implemented by the processor 12a.

In addition, the functions described above are implemented by the processor 12a executing a program installed in the relay apparatus 12, which is a computer. The program includes instructions corresponding to the above-described functions. This program is supplied to the relay apparatus 12 via, for example, a computer-readable information storage medium such as an optical disc, a magnetic disk, a magnetic tape, a magneto-optical disk, or a flash memory, or via the Internet or the like.

In the present embodiment, for example, the party management data storage section 20 of the voice chat apparatus 10 and the party management data storage section 40 of the relay apparatus 12 store the party management data exemplified in FIG. 7.

In the present embodiment, for example, in response to the reception of the party management data transmitted from the management server 14, the party management section 22 of the voice chat apparatus 10 updates the party management data stored in the party management data storage section 20 to the received party management data.

In the present embodiment, for example, in response to the reception of the party management data transmitted from the management server 14, the party management section 42 of the relay apparatus 12 updates the party management data stored in the party management data storage section 40 to the received party management data.

For example, when the user performs an operation to join an existing party, the management server 14 adds the user data including the user ID of this user to the party management data including the party ID of this party. Hereinafter, this user data will be referred to as additional user data. Here, the connection destination address data of the additional user data is set to the address of the voice chat apparatus 10 used by this user. Further, the type data of the additional user data is set to a value indicating the type of the relevant voice chat apparatus 10.

Further, the value of the P2P connection flag of the additional user data is set to 1 or 0, as described above. Here, for example, the value of the P2P connection flag of this user data may be determined on the basis of the number of voice chat apparatuses 10 that transmit and receive pieces of sound data representing sounds in voice chat to and from each other. For example, the value of the P2P connection flag of this user data may be determined on the basis of the number of pieces of user data included in the party management data corresponding to this party.

Specifically, for example, in a case where the number of pieces of user data included in the party management data including the additional user data is 8 or less, the value of the P2P connection flag of the additional user data may be set to 1. Further, in a case where the number of pieces of user data included in the party management data including the additional user data is equal to or greater than 9, the value of the P2P connection flag of the additional user data may be set to 0.

In this manner, while there are only a small number of voice chat apparatuses 10 that transmit and receive pieces of sound data to and from each other, the voice chat apparatuses 10 transmit and receive the pieces of sound data to and from each other through the P2P connection. In this case, the relay apparatus 12 is not used in transmitting and receiving the pieces of sound data. Thus, in a case where there are only a small number of voice chat apparatuses 10 that transmit and receive pieces of sound data to and from each other, the load on the relay apparatus 12 can be suppressed.

On the other hand, in a case where there are many voice chat apparatuses 10 that transmit and receive pieces of sound data to and from each other, the communication volume of the pieces of sound data flowing through the computer network 16 becomes excessively large because there are many voice chat apparatuses 10 that are transmission destinations of a single voice chat apparatus 10. Here, as described above, in response to an increase in the number of voice chat apparatuses 10 that transmit and receive pieces of sound data to and from each other, the relay apparatus 12 is also used to transmit and receive the pieces of sound data. This makes it possible to prevent the communication volume of the pieces of sound data from becoming excessively large.

It is noted that in a case where the number of pieces of user data included in the party management data is 8 or less, the voice chat apparatus 10 used by the user who has performed the joining operation may attempt to achieve the P2P connection to each of the voice chat apparatuses 10 used by the other users participating in the same party. Then, in a case where the P2P connections to all the voice chat apparatuses 10 have been successful, the value of the P2P connection flag of the additional user data may be set to 1. On the other hand, in a case where any of the P2P connections to the voice chat apparatuses 10 has failed, the value of the P2P connection flag of the additional user data may be set to 0.

As described above, in response to the addition of the additional user data to the party management data stored in the management server 14 in this manner, the party management data stored in each of the voice chat apparatuses 10 used by the users participating in this party is updated. Further, the party management data stored in the relay apparatus 12 is also similarly updated.

In the present embodiment, for example, the sound acceptance section 24 accepts sound for voice chat. By encoding the sound, the sound acceptance section 24 may generate sound data representing the sound.

In the present embodiment, for example, the VAD data generation section 26 generates the above-described VAD data on the basis of the sound data generated by the sound acceptance section 24.

In the present embodiment, for example, the volume data generation section 28 generates the above-described volume data on the basis of the sound data generated by the sound acceptance section 24.

In the present embodiment, for example, the sound data transmission section 30 of the voice chat apparatus 10 transmits sound data representing the sound accepted by the sound acceptance section 24. Here, the sound data transmission section 30 may transmit the sound data associated with the identification information of the relevant voice chat apparatus 10. Further, the sound data transmission section 30 may also transmit sound data associated with the identification information of the relevant voice chat apparatus 10, the VAD data generated by the VAD data generation section 26, and the volume data generated by the volume data generation section 28. Further, data indicating a time period corresponding to this sound data, such as a timestamp, may be associated with this sound data.

Further, as described above, the sound data transmission section 30 of the voice chat apparatus 10 may transmit the sound data to the voice chat apparatuses 10 used by the other users participating in the same party as the user using the relevant voice chat apparatus 10. Further, the sound data transmission section 30 of the voice chat apparatus 10 may transmit, to the relay apparatus 12, the sound data addressed to the voice chat apparatuses 10 used by the other users participating in the same party as the user using the relevant voice chat apparatus 10.

In the present embodiment, for example, the sound data reception section 32 of the voice chat apparatus 10 receives sound data. Here, the sound data reception section 32 may receive a plurality of pieces of sound data transmitted from transmission apparatuses that are different from each other. In the example described above, each of the voice chat apparatuses 10 used by the other users participating in the same party as the user using the relevant voice chat apparatus 10 or the relay apparatus 12 corresponds to such a transmission apparatus.

The sound data reception section 32 of the voice chat apparatus 10 may directly transmit pieces of sound data from the voice chat apparatuses 10 used by the other users participating in the same party as the user using the relevant voice chat apparatus 10. Further, the sound data reception section 32 of the voice chat apparatus 10 may also receive pieces of sound data transmitted via the relay apparatus 12 from the voice chat apparatuses 10 used by the other users participating in the same party as the user using the relevant voice chat apparatus 10.

In the present embodiment, for example, the selection section 34 of the voice chat apparatus 10 selects a portion of a plurality of pieces of sound data received by the sound data reception section 32 of the voice chat apparatus 10. Here, as described above, the selection section 34 may select a portion of the plurality of pieces of sound data on the basis of at least one of the result of the voice activity detection process performed on each of the pieces of sound data or the volumes of the sounds represented by the pieces of sound data.

In the present embodiment, for example, the selected sound data output section 36 outputs the portion of the pieces of sound data, the portion having been selected by the selection section 34 of the voice chat apparatus 10. Here, for example, the portion of the pieces of sound data, the portion having been selected by the selection section 34 of the voice chat apparatus 10, is output to the sound output section 38.

In the present embodiment, for example, the sound output section 38 decodes the sound data output from the selected sound data output section 36. In addition, in the present embodiment, for example, the sound output section 38 outputs a sound that is generated by decoding the sound data and that represents the sound data.

In the present embodiment, for example, the sound data reception section 44 of the relay apparatus 12 receives a plurality of pieces of sound data transmitted from transmission apparatuses that are different from each other. In the above-described example, each voice chat apparatus 10 that transmits sound data to the relay apparatus 12 corresponds to such a transmission apparatus. The sound data reception section 44 of the relay apparatus 12 receives, for example, pieces of sound data transmitted from the sound data transmission sections 30 of the voice chat apparatuses 10.

In the present embodiment, for example, the selection section 46 of the relay apparatus 12 selects a portion of the plurality of pieces of sound data received by the sound data reception section 44 of the relay apparatus 12. Here, as described above, the selection section 46 may select a portion of the plurality of pieces of sound data on the basis of at least one of the result of the voice activity detection process performed on each of the pieces of sound data or the volumes of the sounds represented by the pieces of sound data.

In the present embodiment, for example, the sound data transmission section 48 of the relay apparatus 12 transmits the portion of the pieces of sound data, the portion having been selected by the selection section 46 of the relay apparatus 12, to reception apparatuses capable of voice-chatting with the transmission apparatuses that are the transmission sources of the pieces of sound data received by the sound data reception section 44 of the relay apparatus 12. In the above-described example, the voice chat apparatuses 10 correspond to such reception apparatuses. Here, on the basis of the user ID associated with sound data, the sound data transmission section 48 may identify the party to which the user represented by the relevant user ID belongs. Then, the sound data transmission section 48 may transmit the sound data to the voice chat apparatuses 10 used by the users participating in the party, except for the voice chat apparatus 10 used by the user associated with the relevant user ID.

Further, the relay apparatus 12 may receive a plurality of pieces of sound data that are transmitted from respective communication apparatuses that are different from each other and included in a first group. The relay apparatus 12 may then transmit a portion selected from among the plurality of pieces of sound data to the communication apparatuses other than any communication apparatus that has transmitted sound data corresponding to the portion. In the examples of FIGS. 5 and 6, the voice chat apparatuses 10-4 to 10-6 correspond to the communication apparatuses included in the first group. In other words, the voice chat apparatus 10 associated with the user data whose value of the P2P connection flag is 0 corresponds to the communication apparatus included in the first group.

Further, the voice chat apparatus 10 included in a second group may receive the above-described portion of the pieces of sound data, the portion having been transmitted from the relay apparatus 12, and at least one piece of sound data transmitted from any of the other communication apparatuses that are different from each other and included in the second group. The relevant voice chat apparatus 10 may then output a portion of the plurality of pieces of sound data received to the sound output section 38 of the relevant voice chat apparatus 10. In the example of FIG. 6, the voice chat apparatus 10-1 corresponds to the voice chat apparatus 10 that receives the pieces of sound data. Further, the voice chat apparatuses 10-1 to 10-3 correspond to the communication apparatuses included in the second group. In other words, the voice chat apparatus 10 associated with the user data whose value of the P2P connection flag is 1 corresponds to the communication apparatus included in the second group.

Further, as described above, the management server 14 may determine whether a communication apparatus newly added to the voice chat system 1 is to be included in the first group or the second group, on the basis of the number of communication apparatuses that transmit and receive pieces of sound data to and from each other. For example, as described above, the management server 14 may determine the value of the P2P connection flag included in the user data corresponding to the newly added voice chat apparatus 10, on the basis of the number of voice chat apparatuses 10 that transmit and receive pieces of sound data to and from each other.

Figure 9:
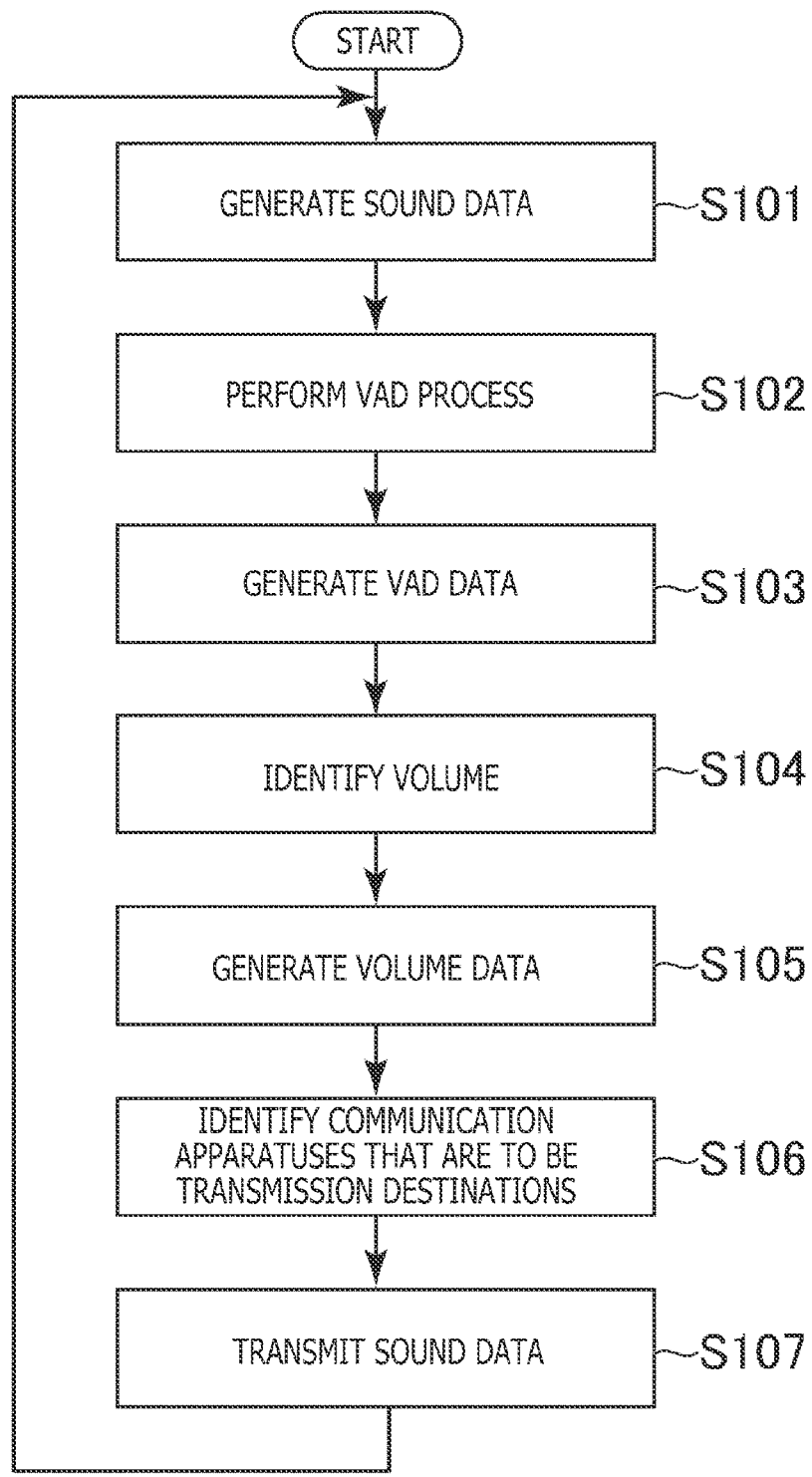
FIG. 9 is a flow diagram illustrating an example of a processing flow performed in the voice chat apparatus according to the embodiment of the present invention.

Here, an example of a flow of a sound data transmission process performed in the voice chat apparatus 10 according to the present embodiment is described with reference to a flow diagram exemplified in FIG. 9. Processes indicated in S101 to S107 of FIG. 9 are repeatedly performed every predetermined time period (e.g., every 20 milliseconds or every 40 milliseconds).

First, the sound acceptance section 24 generates sound data by encoding sound accepted in this loop period (S101).

Then, the VAD data generation section 26 performs a VAD process on the sound data generated in the process indicated in S101, thereby determining whether or not this sound data represents a human voice (S102).

Then, the VAD data generation section 26 generates the VAD data according to the result of the determination in the process indicated in S102 (S103).

Then, the volume data generation section 28 identifies the volume of the sound represented by the sound data generated in the process indicated in S101 (S104).

Then, the volume data generation section 28 generates volume data indicating the volume identified in the process indicated in S104 (S105).

Then, the sound data transmission section 30 identifies communication apparatuses that are to be sound data transmission destinations, on the basis of the party management data stored in the party management data storage section 20 (S106). Here, for example, the sound data transmission section 30 identifies the addresses of the voice chat apparatuses 10 that are to be transmission destinations and whether or not the sound data needs to be transmitted to the relay apparatus 12.

Then, the sound data transmission section 30 transmits the sound data generated in the process indicated in S101 to the transmission destinations identified in the process indicated in S106 (S107), and the process returns to the process indicated in S101. As described above, this sound data is associated with the user ID of the user using the relevant voice chat apparatus 10, the VAD data generated in the process indicated in S103, and the volume data generated in the process indicated in S105. Further, data indicating this loop period, such as a timestamp, may be associated with the relevant sound data.

It is noted that, in order to prevent chattering, when it is determined in the process indicated in S102 that the sound data represents a human voice, the process indicated in S102 may not be performed over a predetermined time period (e.g., one second) starting from the timing of the determination. Then, over this time period, VAD data with a value of 1 may be generated in the process indicated in S103.

Figure 10A:
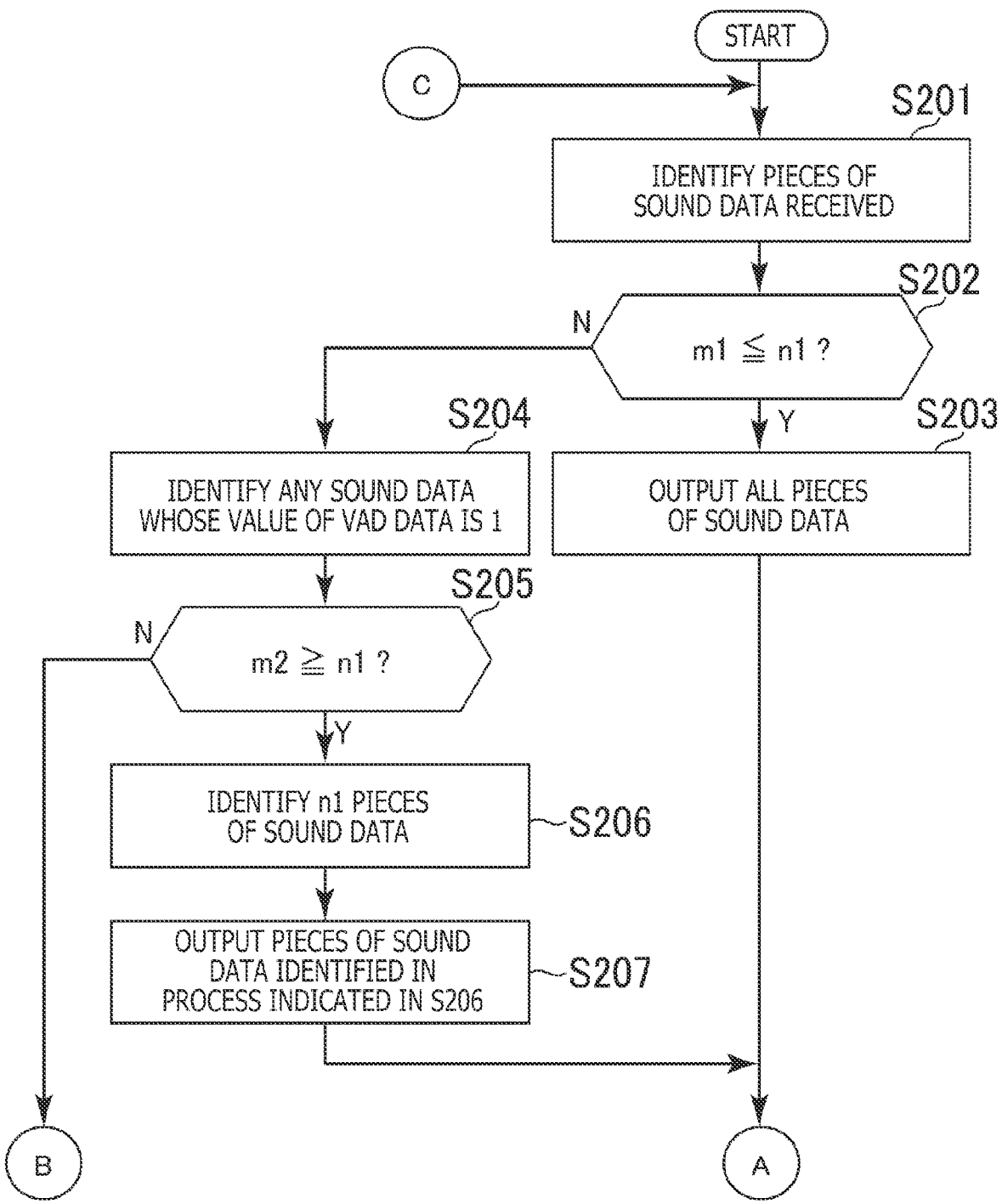
FIG. 10A is a flow diagram illustrating an example of a processing flow performed in the voice chat apparatus according to the embodiment of the present invention.
Figure 10B:
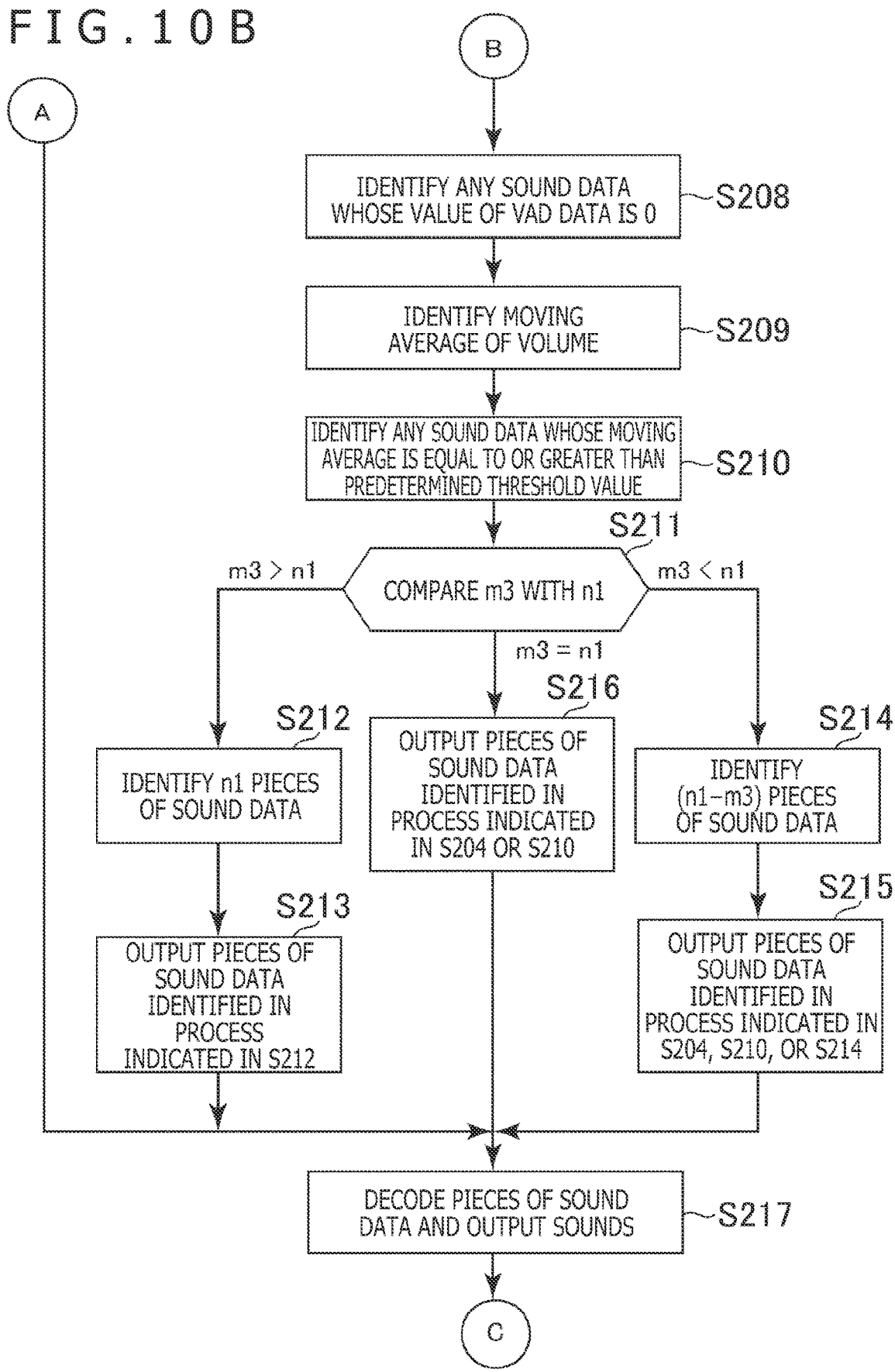
FIG. 10B is a flow diagram illustrating an example of the processing flow performed in the voice chat apparatus according to the embodiment of the present invention.

Next, an example of a flow of a sound output process performed in the voice chat apparatus 10 according to the present embodiment will be described with reference to flow diagrams exemplified in FIGS. 10A and 10B. Processes indicated in S201 to S217 of FIGS. 10A and 10B are repeatedly performed every predetermined time period (e.g., every 20 milliseconds or every 40 milliseconds). Further, in the following description, it is assumed that the maximum number of pieces of sound data that can be received by the sound output section 38 in the relevant voice chat apparatus 10 during a single time period is determined in advance. Hereinafter, the maximum number will be expressed as n1.

First, the selection section 34 identifies pieces of sound data received by the sound data reception section 32 during this loop period (S201).

Then, the selection section 34 checks whether or not the number of pieces of sound data identified in the process indicated in S201 (hereinafter expressed as m1) is equal to or less than n1 (S202).

Assume that it is confirmed in the process indicated in S202 that m1 is equal to or less than n1 (S202: Y). In this case, the selected sound data output section 36 outputs all the pieces of sound data identified in the process indicated in S201 to the sound output section 38 (S203).

Assume that it is confirmed in the process indicated in S202 that m1 is greater than n1 (S202: N). In this case, the selection section 34 identifies, from among the plurality of pieces of sound data identified in the process indicated in S201, any sound data whose value of the associated VAD data is 1 (S204).

Then, the selection section 34 checks whether or not the number of pieces of sound data identified in the process indicated in S204 (hereinafter expressed as m2) is equal to or greater than n1 (S205).

Assume that it is confirmed in the process indicated in S205 that m2 is equal to or greater than n1 (S205: Y). In this case, the selection section 34 identifies n1 pieces of sound data in descending order of the volume indicated by the associated volume data from among the plurality of pieces of sound data identified in the process indicated in S204 (S206). In a case where m2 is equal to n1, all the pieces of sound data identified in the process indicated in S204 are identified in the process indicated in S206.

Then, the selected sound data output section 36 outputs the n1 pieces of sound data identified in the process indicated in S206 to the sound output section 38 (S207).

Assume that it is confirmed in the process indicated in S205 that m2 is less than n1 (S205: N). In this case, the selection section 34 identifies, from among the plurality of pieces of sound data identified in the process indicated in S201, any sound data whose value of the associated VAD data is 0 (S208).

Then, for each of the pieces of sound data identified in the process indicated in S208, the selection section 34 identifies a moving average of the volume of the sound represented by the sound data (S209). Here, the moving average of the volume of the sound represented by the sound data refers to, for example, the average of the volumes of the sounds represented by the pieces of sound data received from the voice chat apparatus 10 that is the transmission source of these pieces of sound data during the most recent predetermined round or the most recent predetermined time period (e.g., during the most recent one second). It is noted that, in identifying the moving average, the selection section 34 may store at least pieces of sound data received over the most recent predetermined round or the most recent predetermined time period.

Then, the selection section 34 identifies, from among the plurality of pieces of sound data identified in the process indicated in S208, any sound data whose moving average identified in the process indicated in S209 is equal to or greater than a predetermined threshold value (e.g., −40 dBOV or greater) (S210).

Then, the selection section 34 compares the sum of the number of pieces of sound data identified in the process indicated in S204 and the number of pieces of sound data identified in the process indicated in S210 (hereinafter expressed as m3) with n1 (S211).

Assume that it is confirmed in the process indicated in S211 that m3 is greater than n1. In this case, the selection section 34 identifies n1 pieces of sound data in descending order of the volume indicated by the associated volume data from among the plurality of pieces of sound data identified in the process indicated in S204 or S210 (S212). Then, the selected sound data output section 36 outputs the n1 pieces of sound data identified in the process indicated in S212 to the sound output section 38 (S213).

Assume that it is confirmed in the process indicated in S211 that m3 is less than n1. In this case, the selection section 34 identifies (n1-m3) pieces of sound data in descending order of the volume indicated by the associated volume data from among the remaining pieces of sound data that have not been identified in the process indicated in S204 or S210 (S214). Then, the selected sound data output section 36 outputs a total of n1 pieces of sound data identified in the process indicated in S204, S210, or S214 to the sound output section 38 (S215).

Assume that it is confirmed in the process indicated in S211 that m3 is equal to n1. In this case, the selection section 34 outputs a total of n1 pieces of sound data identified in the process indicated in S204 or S210 to the sound output section 38 (S216).

Then, the sound output section 38 decodes the pieces of sound data output in the process indicated in S203, S207, S213, S215, or S216 and outputs the sounds represented by these pieces of sound data (S217). Then, the process returns to the process indicated in S201.

According to the processing example illustrated in FIGS. 10A and 10B, the selection section 34 of the voice chat apparatus 10 accurately selects, from among a plurality of pieces of sound data, pieces of sound data that are most likely to represent speeches in voice chat.

It is noted that the sound data selection process is not limited to the one illustrated in the processing example of FIGS. 10A and 10B. For example, the selection section 34 may identify any sound data whose value of the associated VAD data is 1, or whose moving average of the volume is equal to or greater than the predetermined threshold value. Then, from among these pieces of sound data, the selection section 34 may identify n1 pieces of sound data in descending order of the volume indicated by the associated volume data.

Figure 11A:
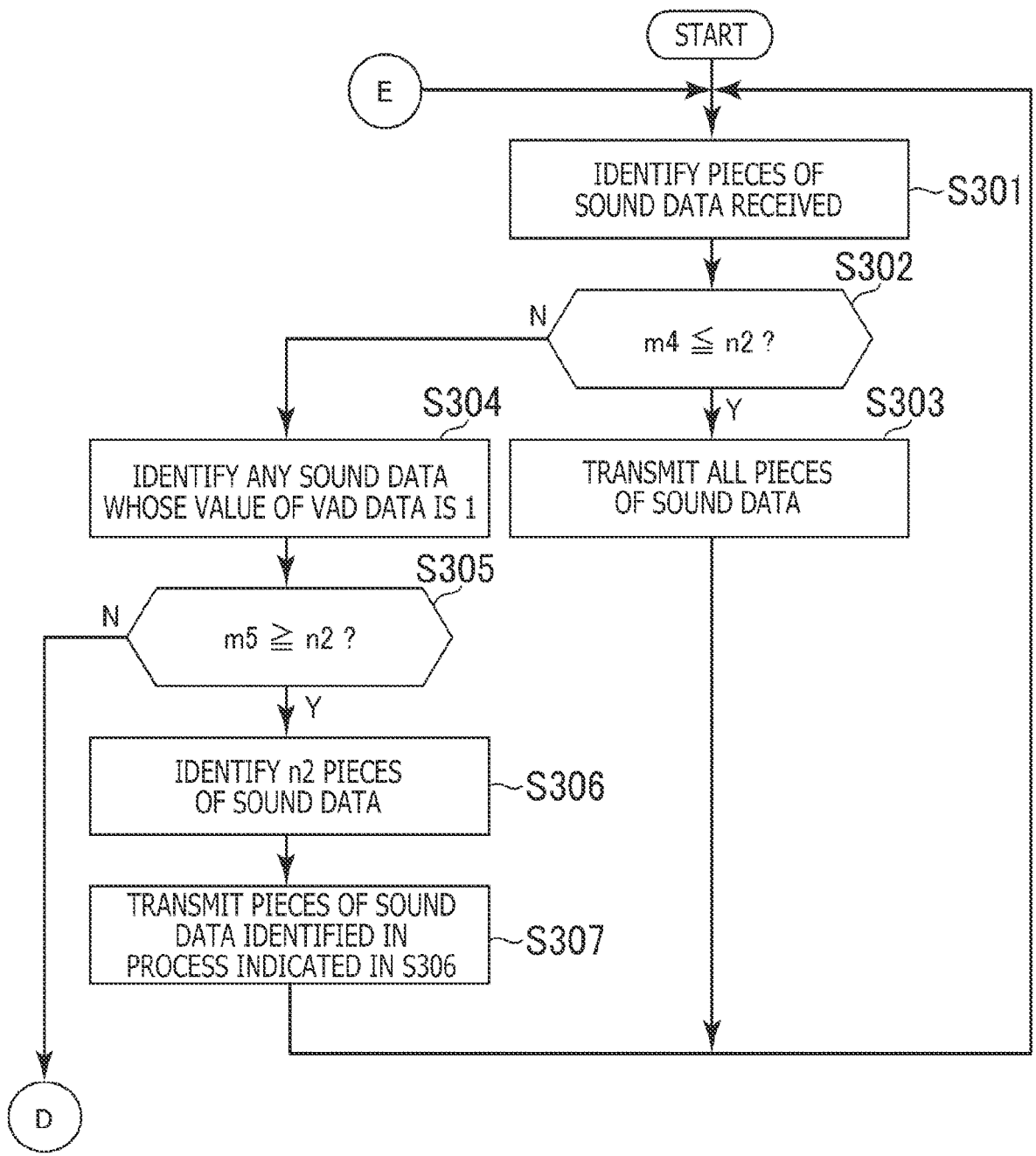
FIG. 11A is a flow diagram illustrating an example of a processing flow performed in the relay apparatus according to the embodiment of the present invention.
Figure 11B:
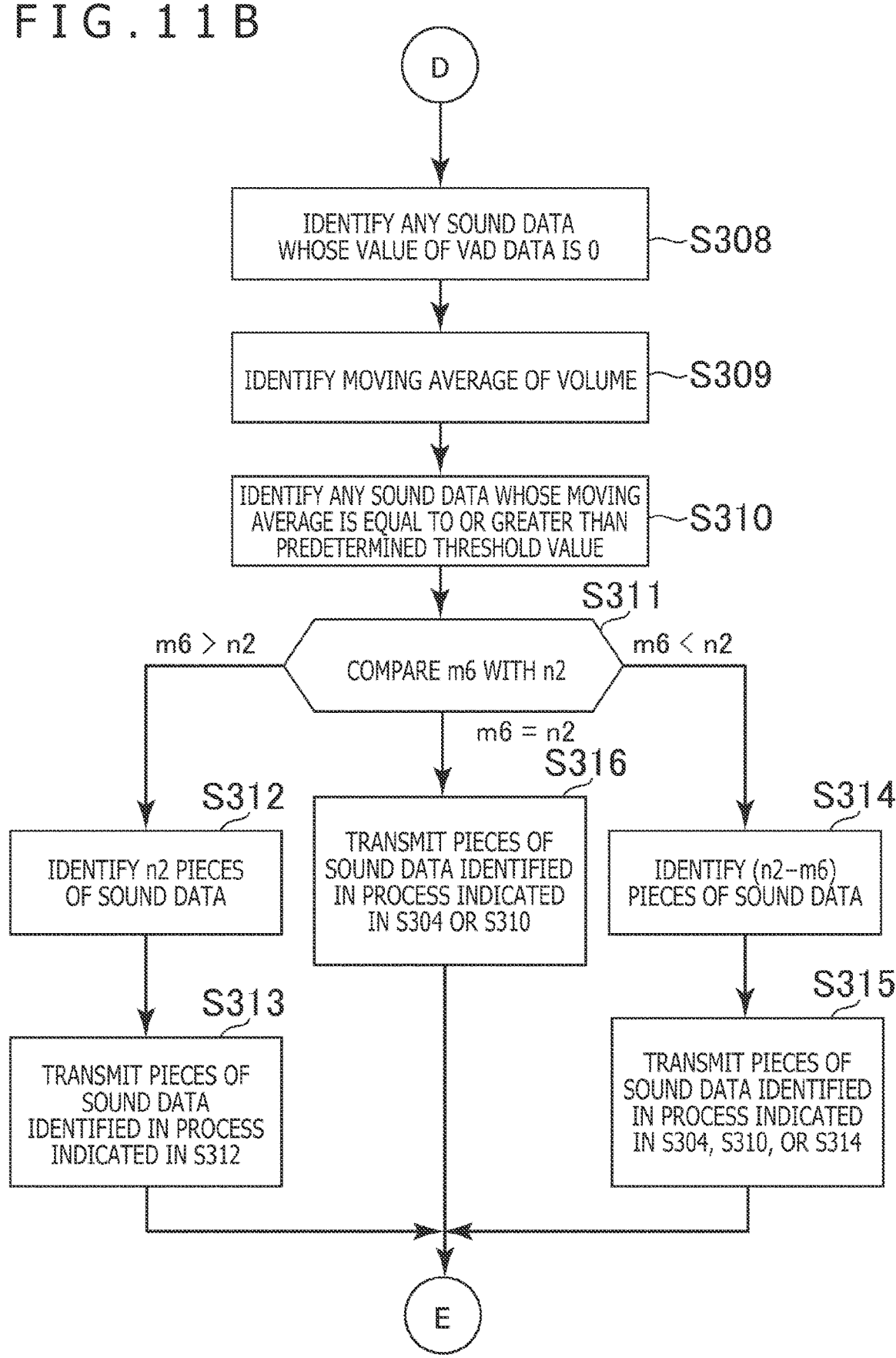
FIG. 11B is a flow diagram illustrating an example of the processing flow performed in the relay apparatus according to the embodiment of the present invention.

Next, an example of a flow of a sound data relay process performed by the relay apparatus 12 according to the present embodiment will be described with reference to flow diagrams exemplified in FIGS. 11A and 11B. Processes indicated in S301 to S316 of FIGS. 11A and 11B are repeatedly performed every predetermined time period (e.g., every 20 milliseconds or every 40 milliseconds). Further, in the following description, it is assumed that the maximum number of pieces of sound data that can be transmitted from the relay apparatus 12 during a single time period is determined in advance. Hereinafter, the maximum number will be expressed as n2.

Further, it is assumed that the selection section 46 of the relay apparatus 12 has preliminarily identified a plurality of voice chat apparatuses 10 that are to be sound data transmission destinations, on the basis of the party management data stored in the party management data storage section 40.

First, the selection section 46 identifies pieces of sound data received by the sound data reception section 44 during this loop period (S301).

Then, the selection section 46 checks whether or not the number of pieces of sound data identified in the process indicated in S301 (hereinafter expressed as m4) is equal to or less than n2 (S302).

Assume that it is confirmed in the process indicated in S302 that m4 is equal to or less than n2 (S302: Y). In this case, the sound data transmission section 48 transmits all the pieces of sound data identified in the process indicated in S301 to the voice chat apparatuses 10 that are the transmission destinations (S303), and the process returns to the process indicated in S301.

Assume that it is confirmed in the process indicated in S302 that m4 is greater than n2 (S302: N). In this case, the selection section 46 identifies, from among the plurality of pieces of sound data identified in the process indicated in S301, any sound data whose value of the associated VAD data is 1 (S304).

Then, the selection section 46 checks whether or not the number of pieces of sound data identified in the process indicated in S304 (hereinafter expressed as m5) is equal to or greater than n2 (S305).

Assume that it is confirmed in the process indicated in S305 that m5 is equal to or greater than n2 (S305: Y). In this case, the selection section 46 identifies n2 pieces of sound data in descending order of the volume indicated by the associated volume data from among the plurality of pieces of sound data identified in the process indicated in S204 (S306). In a case where m5 is equal to n2, all the pieces of sound data identified in the process indicated in S304 are identified in the process indicated in S306.

Then, the sound data transmission section 48 transmits the n2 pieces of sound data identified in the process indicated in S306 to the voice chat apparatuses 10 that are the transmission destinations (S307), and the process returns to the process indicated in S301.

Assume that it is confirmed in the process indicated in S305 that m5 is less than n2 (S305: N). In this case, the selection section 46 identifies, from among the plurality of pieces of sound data identified in the process indicated in S301, any sound data whose value of the associated VAD data is 0 (S308).

Then, for each of the pieces of sound data identified in the process indicated in S308, the selection section 46 identifies a moving average of the volume of the sound represented by the relevant sound data (S309). Here, the moving average of the volume of the sound represented by the sound data refers to, for example, the average of the volumes of the sounds represented by the pieces of sound data received from the voice chat apparatus 10 that is the transmission source of these pieces of sound data during the most recent predetermined round or the most recent predetermined time period (e.g., during the most recent one second). It is noted that, in identifying the moving average, the selection section 46 may store at least pieces of sound data received over the most recent predetermined round or the most recent predetermined time period.

Then, the selection section 46 identifies, from among the plurality of pieces of sound data identified in the process indicated in S308, any sound data whose moving average identified in the process indicated in S309 is equal to or greater than a predetermined threshold value (e.g., −40 dBOV or greater) (S310).

Then, the selection section 46 compares the sum of the number of pieces of sound data identified in the process indicated in S304 and the number of pieces of sound data identified in the process indicated in S210 (hereinafter expressed as m6) with n2 (S311).

Assume that it is confirmed in the process indicated in S311 that m6 is greater than n2. In this case, the selection section 46 identifies n2 pieces of sound data in descending order of the volume indicated by the associated volume data from among the plurality of pieces of sound data identified in the process indicated in S304 or S310 (S312). Then, the sound data transmission section 48 transmits the n2 pieces of sound data identified in the process indicated in S312 to the voice chat apparatuses 10 that are the transmission destinations (S313), and the process returns to the process indicated in S301.

Assume that it is confirmed in the process indicated in S311 that m6 is less than n2. In this case, the selection section 46 identifies (n2-m6) pieces of sound data in descending order of the volume indicated by the associated volume data from among the remaining pieces of sound data that have not been identified in the process indicated in S304 or S310 (S314). Then, the selected sound data output section 36 transmits a total of n2 pieces of sound data identified in the process indicated in S304, S310, or S314 to the voice chat apparatuses 10 that are the transmission destinations (S315), and the process returns to the process indicated in S301.

Assume that it is confirmed in the process indicated in S311 that m6 is equal to n2. In this case, the selection section 46 transmits a total of n2 pieces of sound data identified in the process indicated in S304 or S310 to the voice chat apparatuses 10 that are the transmission destinations (S316), and the process returns to the process indicated in S301.

According to the processing example illustrated in FIGS. 11A and 11B, the selection section 46 of the relay apparatus 12 accurately selects, from among a plurality of pieces of sound data, pieces of sound data that are most likely to represent speeches in voice chat.

The sound data selection based on the VAD data can reduce the possibility of selecting sound data representing a sound other than a human voice, such as the sound of a desk being tapped or the sound of an ambulance, for example. Further, the sound data selection based on the moving average of the volume can increase the possibility of selecting, for example, sound data that has not been selected during the sound data selection based on the VAD data but actually represents a human voice.

It is noted that the sound data selection process is not limited to the one illustrated in the processing example of FIGS. 11A and 11B. For example, the selection section 46 may identify any sound data whose value of the associated VAD data is 1, or whose moving average of the volume is equal to or greater than the predetermined threshold value. Then, from among these pieces of sound data, the selection section 46 may identify n2 pieces of sound data in descending order of the volume indicated by the associated volume data.

Further, as described above, the selection section 34 or the selection section 46 may select a portion of the plurality of pieces of sound data on the basis of the moving averages of the volumes of the sounds represented by the pieces of sound data. With this configuration, the sound data selection is performed in a stable manner.

Further, in the processing example illustrated in FIGS. 11A and 11B, from among the plurality of pieces of sound data, the selection section 46 may select pieces of sound data in the number determined on the basis of the type of voice chat apparatuses 10 that are to be sound data transmission destinations. Then, the sound data transmission section 48 may transmit the portion of the pieces of sound data to the relevant voice chat apparatuses 10. In this case, the above-described number n2 varies depending on the types of voice chat apparatuses 10 that are to be transmission destinations.

Since smartphones are highly likely to use a carrier's network, it is particularly necessary to suppress the communication volume of pieces of sound data flowing through the network. In light of this circumstance, it is preferable that a smaller number of pieces of sound data be transmitted to the voice chat apparatuses 10 that are smartphones than to the voice chat apparatuses 10 that are game consoles, for example.

Further, pieces of sound data in the number determined on the basis of the load on the apparatus or the communication quality of the computer network 16 may be selected from among the plurality of pieces of sound data.

For example, the selection section 34 of the voice chat apparatus 10 may determine the above-described value n1 on the basis of the load on the relevant voice chat apparatus 10.

Further, the selection section 46 of the relay apparatus 12 may determine the above-described value n2 on the basis of the load on the relay apparatus 12 or the communication quality (e.g., communication volume) of the computer network 16.

According to the voice chat system 1 described above, it is possible to appropriately thin out the output of pieces of sound data representing sounds in voice chat. For example, the transmission output of pieces of sound data from the relay apparatus 12 and the output of pieces of sound data from the processor 10a of the voice chat apparatus 10 to the encoding and decoding section 10h can be appropriately thinned out.

It is noted that the present invention is not limited to the embodiment described above.

For example, in the process illustrated in FIGS. 10A and 10B, the selection section 34 may store a list of user IDs representing users who have recently spoken. The list may include n1 user IDs.

Then, the selection section 34 may select a portion of pieces of sound data transmitted from the voice chat apparatuses 10 used by users whose user IDs are not included in the list. Here, n3, which is the number of pieces of sound data to be selected, is less than n1. Then, the selection section 34 may remove n3 user IDs from the list. For example, n3 user IDs may be removed from the list in ascending order of the timing of addition to the list. Further, n3 user IDs may be deleted from the list in ascending order of the volume of the sound represented by the sound data in the most recent period.

Then, the selection section 34 may add the user IDs associated with the selected n3 pieces of sound data to the list.

Then, the selection section 34 may select the pieces of sound data associated with the user IDs included in the list. In this manner, the sound data selection in the voice chat apparatus 10 is performed in a stable manner.

Further, similarly, in the process illustrated in FIGS. 11A and 11B, the selection section 46 may store a list including n2 user IDs. Then, as with the selection section 34 in the above-described example, the pieces of sound data associated with the user IDs included in the list may be selected. With this configuration, the sound data selection in the relay apparatus 12 is performed in a stable manner.

Further, how the roles of the voice chat apparatus 10 and the relay apparatus 12 are split is not limited to those described above. For example, the relay apparatus 12 may determine whether or not the sound data represents a human voice and identify the volume of the sound represented by the sound data. Alternatively, for example, the voice chat apparatus 10 that receives sound data may determine whether or not the sound data represents a human voice and identify the volume of the sound represented by the sound data.

Further, the above-described specific character strings and numerical values and the specific character strings and numerical values in the drawings are examples, and the character strings and the numerical values are not limited thereto.

The invention claimed is:

1. A sound output control apparatus comprising:
a reception section configured to receive a plurality of pieces of sound data transmitted from a plurality of transmission apparatuses, at least one of the plurality of transmission apparatuses being incapable of peer-to-peer connection, at least one other of the plurality of transmission apparatuses being capable of peer-to-peer connection, the capabilities being indicated to the reception section prior to, as to each transmission apparatus, the transmission of sound data from the transmission apparatus, the transmission of sound data from each incapable transmission apparatus being received through a relay apparatus;
a selection section configured to select a portion of the plurality of pieces of sound data on a basis of the peer-to-peer connection capability of one or more of the transmission apparatuses and at least one of a result of a voice activity detection process performed on each of the pieces of sound data or moving averages of volumes of sounds represented by the pieces of sound data; and
an output section configured to output the selected portion of the pieces of sound data.

2. The sound output control apparatus according to claim 1, wherein the output section transmits the selected portion of the pieces of sound data to a reception apparatus capable of voice-chatting with the transmission apparatuses.

3. The sound output control apparatus according to claim 2, wherein, from among the plurality of pieces of sound data, the selection section selects pieces of sound data in a number determined on a basis of a type of the reception apparatus.

4. The sound output control apparatus according to claim 1, further comprising:
a decoding section configured to decode the pieces of sound data,
wherein the output section outputs the selected portion of the pieces of sound data to the decoding section.

5. The sound output control apparatus according to claim 1, wherein, from among the plurality of pieces of sound data, the selection section selects pieces of sound data in a number determined on a basis of a load on the sound output control apparatus or a communication quality of a computer network to which the sound output control apparatus is connected.

6. A sound output control method comprising:
receiving a plurality of pieces of sound data transmitted from a plurality of transmission apparatuses, at least one of the plurality of transmission apparatuses being incapable of peer-to-peer connection, at least one other of the plurality of transmission apparatuses being capable of peer-to-peer connection, the capabilities being indicated to a reception section prior to, as to each transmission apparatus, the transmission of sound data from the transmission apparatus, the transmission of sound data from each incapable transmission apparatus being received through a relay apparatus;
selecting a portion of the plurality of pieces of sound data on a basis of the peer-to-peer connection capability of one or more of the transmission apparatuses and at least one of a result of a voice activity detection process performed on each of the pieces of sound data or moving averages of volumes of sounds represented by the pieces of sound data; and
outputting the selected portion of the pieces of sound data.

7. A non-transitory, computer-readable storage medium containing a computer program, which when executed by a computer, causes the computer to perform a sound output control method by carrying out actions, comprising:
receiving a plurality of pieces of sound data transmitted from a plurality of transmission apparatuses, at least one of the plurality of transmission apparatuses being incapable of peer-to-peer connection, at least one other of the plurality of transmission apparatuses being capable of peer-to-peer connection, the capabilities being indicated to a reception section prior to, as to each transmission apparatus, the transmission of sound data from the transmission apparatus, the transmission of sound data from each incapable transmission apparatus being received through a relay apparatus;
selecting a portion of the plurality of pieces of sound data on a basis of the peer-to-peer connection capability of one or more of the transmission apparatuses and at least one of a result of a voice activity detection process performed on each of the pieces of sound data or moving averages of volumes of sounds represented by the pieces of sound data; and
outputting the selected portion of the pieces of sound data.

8. A sound output control system comprising:
a plurality of communication apparatuses included in a first group, each first group communication apparatus incapable of peer-to-peer connection;
a plurality of communication apparatuses included in a second group, each second group communication apparatus being capable of peer-to-peer connection; and
a relay apparatus,
wherein the relay apparatus includes
a first reception section configured to receive a plurality of pieces of sound data transmitted from the first group communication apparatuses after, as to each first group communication apparatus, receiving an indication, as to its peer-to-peer incapability, prior to a first sound transmission from the first group communication apparatus, and
a transmission section configured to transmit a portion selected from among the plurality of pieces of sound data received by the first reception section of the relay apparatus to the communication apparatuses other than any communication apparatus that has transmitted the sound data corresponding to the portion, and
each of the communication apparatuses included in the second group includes
a decoding section configured to decode the pieces of sound data,
a second reception section configured to receive the portion of the pieces of sound data, the portion having been transmitted from the relay apparatus, and at least one piece of sound data transmitted from any of the other second group communication apparatuses after, as to each second group communication apparatus, receiving an indication, as to its peer-to-peer capability, prior to a first sound transmission from the second group communication apparatus, and
an output section configured to output a portion of a plurality of the pieces of sound data received by the second reception section of the communication apparatus to the decoding section; wherein
the selected portion was selected on a basis of the peer-to-peer connection capability of one or more of the communication apparatuses.

9. The sound output control system according to claim 8, further comprising:
a determination section configured to determine, on a basis of the number of the communication apparatuses that transmit and receive the pieces of sound data to and from each other, whether a communication apparatus newly added to the sound output control system is to be included in the first group or the second group.

* * * * *